US012639775B2

(12) United States Patent (10) Patent No.: US 12,639,775 B2
Gibson (45) Date of Patent: May 26, 2026

(54) SYSTEMS AND METHODS FOR ROOF RECOMMENDATION BASED UPON CUMULATIVE WEATHER DAMAGE

(71) Applicant: STATE FARM MUTUAL AUTOMOBILE INSURANCE COMPANY, Bloomington, IL (US)

(72) Inventor: Sharon Gibson, Apache Junction, AZ (US)

(73) Assignee: STATE FARM MUTUAL AUTOMOBILE INSURANCE, Bloomington, IL (US)

( * ) Notice: Subject to any disclaimer, the term of this patent is extended or adjusted under 35 U.S.C. 154(b) by 27 days.

(21) Appl. No.: 18/416,337

(22) Filed: Jan. 18, 2024

(65) Prior Publication Data

US 2025/0054086 A1 Feb. 13, 2025

Related U.S. Application Data

(60) Provisional application No. 63/531,902, filed on Aug. 10, 2023.

(51) Int. Cl.
G06Q 30/00 (2023.01)
G06Q 50/163 (2024.01)
(52) U.S. Cl.
CPC ................................. G06Q 50/163 (2013.01)
(58) Field of Classification Search
CPC .................................................. G06Q 50/163
See application file for complete search history.

(56) References Cited

U.S. PATENT DOCUMENTS

| | | | | |
|---|---|---|---|---|
| 9,152,863 B1* | 10/2015 | Grant | ..................... | G06Q 10/20 |
| 2015/0170288 A1* | 6/2015 | Harton | ................... | G06Q 40/08 |
| | | | | 705/4 |
| 2015/0228031 A1* | 8/2015 | Emison | ................. | G06F 16/116 |
| | | | | 705/4 |
| 2015/0302529 A1* | 10/2015 | Jagannathan | .......... | G06Q 40/08 |
| | | | | 705/4 |
| 2018/0336418 A1* | 11/2018 | Splittstoesser | .......... | G06F 18/22 |
| 2019/0114717 A1* | 4/2019 | Labrie | ................... | G06Q 40/08 |

OTHER PUBLICATIONS

Heneka et al., "A damage model for the assessment of storm damage to buildings," Engineering Structures, Dec. 2008 v30i12; 7pgs. (Year: 2008).*

* cited by examiner

*Primary Examiner* — Robert M Pond
(74) *Attorney, Agent, or Firm* — MARSHALL, GERSTEIN & BORUN LLP; William J. Samore

(57) ABSTRACT

Systems and methods for roof recommendation based upon cumulative weather damage is disclosed herein. An exemplary computing environment includes one or more processors; and a memory storing executable instructions thereon. When executed by the one or more processors, these instructions may cause the one or more processors to: receive roof data from an electronic device and/or database indicating at least a geolocation of a roof, obtain weather data for the geolocation of the roof indicating the weather over a period of time at least near the geolocation, determine a roof recommendation based upon the roof data and the weather data, and/or generate a roof recommendation signal indicating the roof recommendation.

17 Claims, 7 Drawing Sheets

100

160 Sensor(s)
162 Processor(s)
164 NIC
166 Memory

150 External Server
152 Processor(s)
154 NIC
156 Memory

120 Server(s)
122 Processor(s)
124 NIC
126 Memory

123 Modules
121 I/O
128 Recommending Module
127 ML Module
129 Machine Learning Training
125 Machine Learning Operation 110 Network

140

130 Database

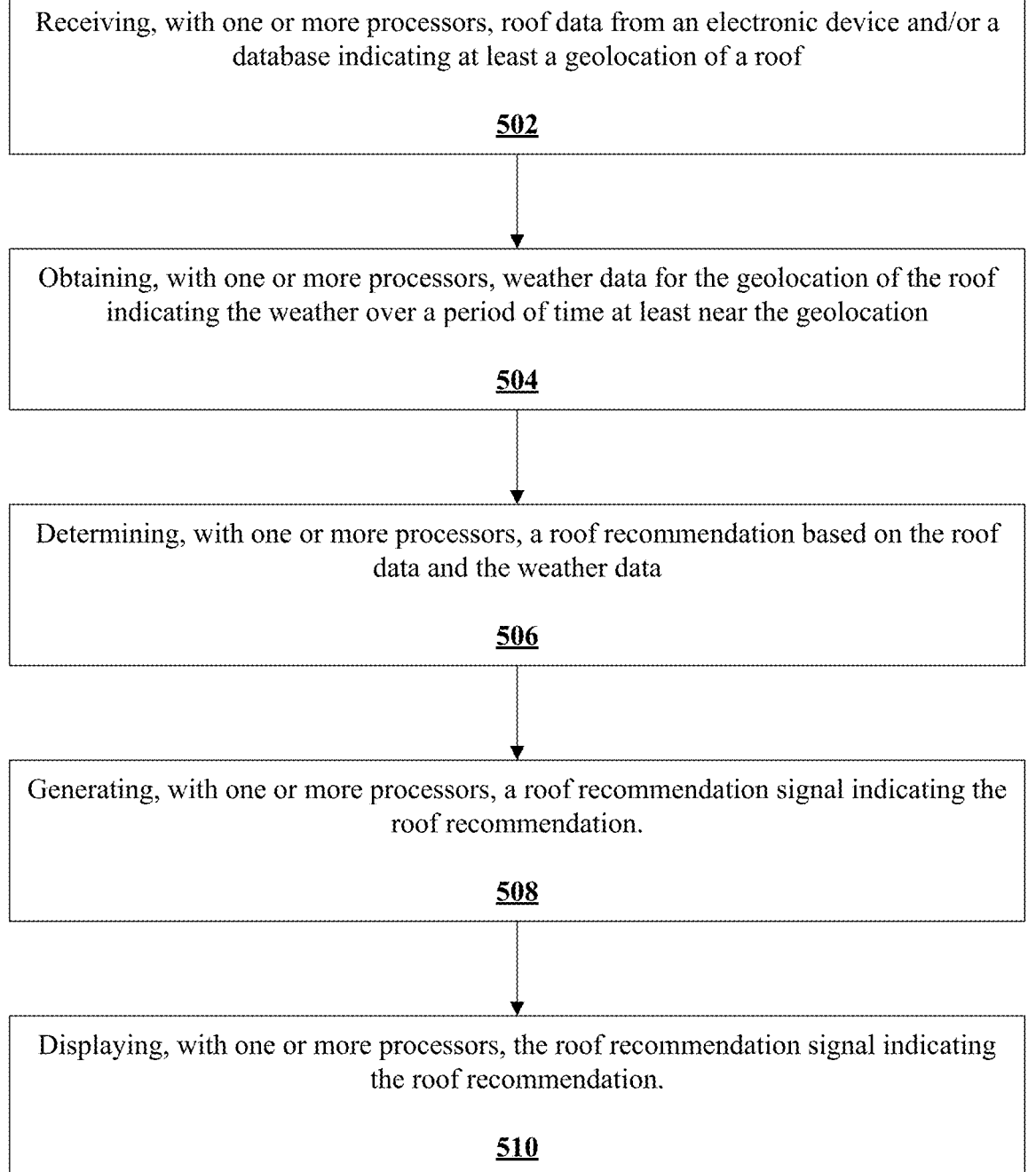

Receiving, with one or more processors, roof data from an electronic device and/or a database indicating at least a geolocation of a roof

502

Obtaining, with one or more processors, weather data for the geolocation of the roof indicating the weather over a period of time at least near the geolocation

504

Determining, with one or more processors, a roof recommendation based on the roof data and the weather data

506

Generating, with one or more processors, a roof recommendation signal indicating the roof recommendation.

508

Displaying, with one or more processors, the roof recommendation signal indicating the roof recommendation.

SYSTEMS AND METHODS FOR ROOF RECOMMENDATION BASED UPON CUMULATIVE WEATHER DAMAGE

CROSS REFERENCE TO RELATED APPLICATIONS

This application claims the benefit of U.S. Provisional Application No. 63/531,902, entitled "Systems and Methods for Roof Recommendation Based Upon Cumulative Weather Damage" (filed Aug. 10, 2023), the entirety of which is incorporated by reference herein.

FIELD

The present disclosure generally relates to roof recommendation, and more particularly, roof recommendation based upon cumulative weather damage and/or other factors of roof lifespan.

BACKGROUND

Generally speaking, structures (e.g., a home, a building) may rely on proper roof monitorization and maintenance to mitigate and/or prevent hazardous and costly consequences of a roof failing to protect a structure from weather (or weather related) events. In conventional roof maintenance, the homeowner, for example, or another responsible party may take an active role to assess the roof's condition, including physical inspections, hiring professionals, or monitoring the home for signs of roof failure. These practices may be inefficient because resources are spent regardless of if the roof requires maintenance, and rely on the homeowner to be sufficiently risk averse. On the other hand, a homeowner who does not actively monitor their roof may risk possibly catastrophic consequences to their property.

Conventional techniques may include additional drawbacks, inefficiencies, encumbrances, and/or ineffectiveness. For example, it may be generally difficult for a homeowner to conceptualize or predict the incremental aging a roof experiences over its lifetime from each weather (or weather related) event and know when to invest resources into inspections or professional assistance. Accordingly, conventional techniques may be generally inefficient, have limited perspective, and may require significant effort on behalf of the homeowner to avoid property damage.

The systems and methods disclosed herein may provide solutions to these problems and may provide solutions to other drawbacks of conventional techniques.

SUMMARY

The present embodiments relate to, inter alia, roof recommendation based upon cumulative weather damage. For example, over a roof's lifetime it is exposed to various weather conditions which directly, or indirectly, cause damages. These damages, or "micro-damages," may be difficult to perceive when considered individually. In conventional techniques, an insurance company, for example, may periodically (e.g., every year) remind a homeowner to hire a professional to inspect the roof to aid the homeowner in roof maintenance. Additionally, or alternatively, a homeowner may not have the roof inspected until after a severe weather event or observing symptoms which indicate severe, possibly preventable, damage (e.g., water leaking from ceiling, smell of mold, etc.). For improved roof recommendation, micro-damages may be monitored and analyzed cumulatively.

In one aspect, a computer system configured for roof recommendation may be provided. The computer system may include one or more local or remote processors, sensors, transceivers, servers, memory units, augmented reality glasses or headsets, virtual reality headsets, extended or mixed reality headsets, smart glasses or watches, wearables, voice bot or chatbot, ChatGPT bot, airplanes, satellites, drones or other unmanned aerial vehicles (UAVs), and/or other electronic or electrical components, which may be in wired or wireless communication with one another. For example, in one instance, the computer system may include one or more processors configured to: (1) receive roof data from an electronic device and/or a database indicating at least a geolocation of a roof, (2) obtain weather data for the geolocation of the roof indicating the weather over a period of time at least near the geolocation, (3) determine a roof recommendation based upon the roof data and the weather data, and/or (4) generate a roof recommendation signal indicating the roof recommendation. The computer system may include additional, less, or alternate functionality, including that discussed elsewhere herein.

In another aspect, a computer-implemented method for roof recommendation may be provided. The method may be implemented via one or more local or remote processors, sensors, transceivers, servers, memory units, augmented reality glasses or headsets, virtual reality headsets, extended or mixed reality headsets, smart glasses or watches, wearables, voice bot or chatbot, ChatGPT bot, airplanes, satellites, drones or other unmanned aerial vehicles (UAVs), and/or other electronic or electrical components, which may be in wired or wireless communication with one another. For instance, in one example, the method may include: (1) receiving roof data from an electronic device and/or a database indicating at least a geolocation of a roof; (2) obtaining weather data for the geolocation of the roof indicating the weather over a period of time at least near the geolocation; (3) determining a roof recommendation based upon the roof data and the weather data; and/or (4) generating a roof recommendation signal indicating the roof recommendation. The computer-implemented method may include additional, less, or alternate functionality, including those discussed elsewhere herein.

In yet another aspect, a non-transitory computer-readable storage medium comprising computer-readable instructions stored thereon for roof recommendation may be provided. The instructions, when executed by one or more processors, may cause the one or more processors to: (1) receive roof data from an electronic device and/or a database indicating at least a geolocation of a roof, (2) obtain weather data for the geolocation of the roof indicating the weather over a period of time at least near the geolocation, (3) determine a roof recommendation based upon the roof data and the weather data, and/or (4) generate a roof recommendation signal indicating the roof recommendation. The instructions may include additional, less, or alternate functionality, including that discussed elsewhere herein.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 5 illustrates an exemplary computer-implemented method or implementation for roof recommendation based upon cumulative weather damage.

DETAILED DESCRIPTION

The systems and methods disclosed herein relate to, inter alia, roof recommendation based upon cumulative weather damage.

As used herein, the term "weather related events" (e.g., mudslides, debris impact, moss growing on roof due to humid and rainy weather) should be understood to mean events and/or occurrences which degrade a roof, other than phenomena of weather (weather events). Weather related events may include, but are not limited to, debris (e.g., tree branches, satellite dish, sand, dirt) impacting and/or remaining on a roof, organisms (e.g., moss, termites, birds) growing in and/or on a roof, etc. As used herein, the term "weather events" (e.g., rainstorms, sunny, cloudless, thunderstorms) should be understood to mean events and/or occurrences which degrade a roof.

Figure 1A:
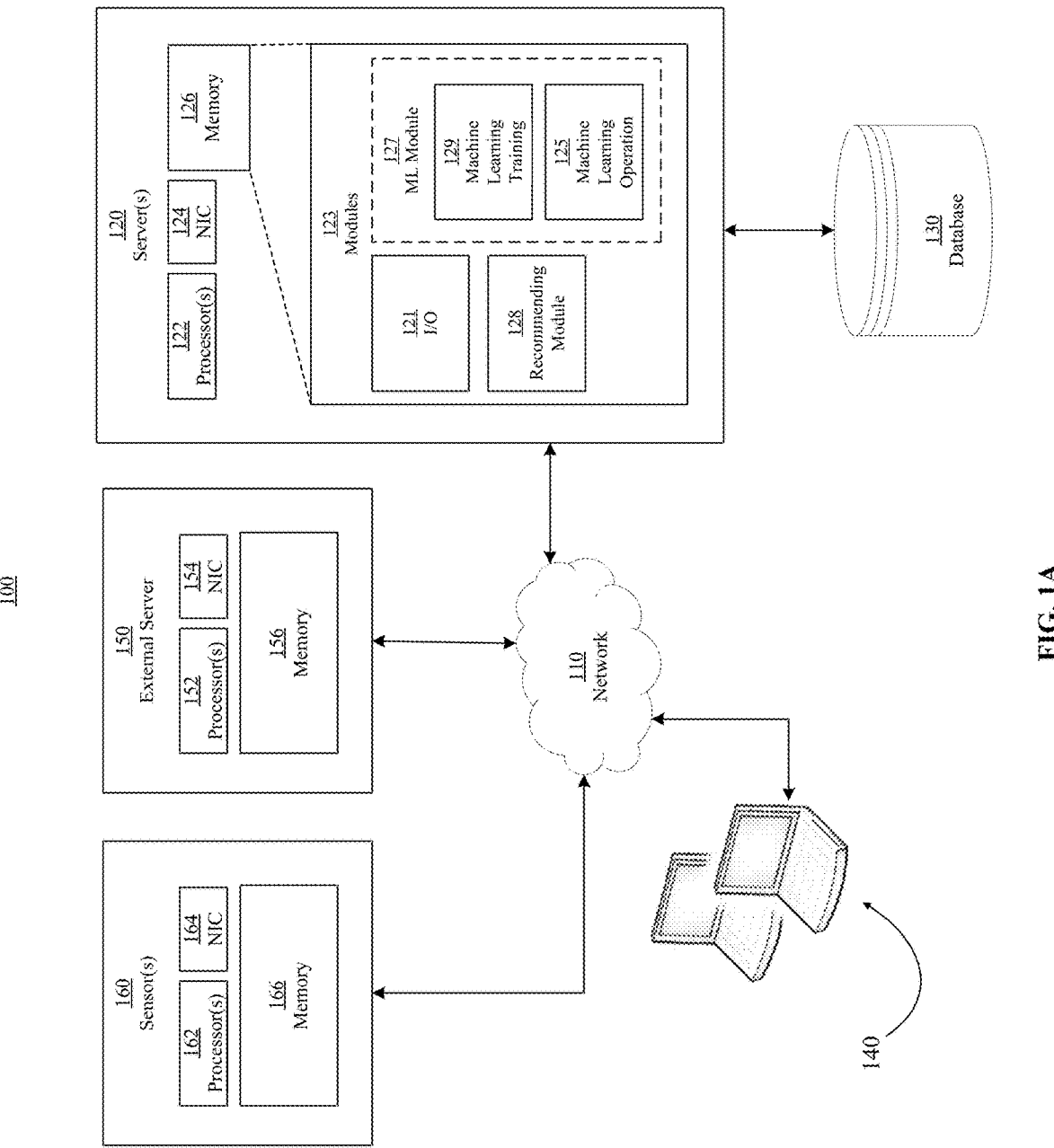
FIG. 1A depicts an exemplary computer system for roof recommendation based upon cumulative weather damage, according to one embodiment.

Exemplary Computing Environment for Roof Recommendation Based Upon Cumulative Weather Damage FIG. 1A depicts an exemplary computing environment 100 in which roof recommendation based upon cumulative weather damage may be performed, in accordance with various aspects discussed herein. Generally, the computing environment 100 may determine a roof recommendation and generate a roof recommendation signal indicating the roof recommendation. In the exemplary aspect of FIG. 1A, the computing environment 100 includes an electronic device 140, one or more servers 120, a database 130, an external server 150, one or more sensors 160, and a network 110.

In various aspects the electronic device 140 comprises one or more computers which may comprise multiple, redundant, or replicated client computers accessed by one or more users. The computing environment 100 may include an electronic network 110 communicatively coupling the electronic device 140 to other components of the computing environment 100.

The electronic device 140 may be any suitable device and include one or more mobile devices, wearables, smart watches, smart contact lenses, smart glasses, augmented reality glasses, virtual reality headsets, mixed or extended reality glasses or headsets, voice bots or chatbots, ChatGPT bots, and/or other electronic or electrical component. The electronic device 140 may include a memory and a processor for, respectively, storing and executing one or more modules. The memory may include one or more suitable storage media such as a magnetic storage device, a solid-state drive, random access memory (RAM), etc. The electronic device 140 may access services or other components of the computing environment 100 via the network 110. In some aspects, the electronic device 140 may be and/or include an imaging device (e.g., camera, light detection and ranging (LIDAR) sensor, infrared scanner, etc.) capable of generating imagery data (e.g., photo, three-dimensional (3D) scan, heat scan image, etc.), as discussed elsewhere herein. In some aspects, the electronic device 140 may include instruments to obtaining a geolocation of the electronic device 140, such as via a global positioning system (GPS), as discussed elsewhere herein.

In some aspects the electronic device 140 may be a roof inspector electronic device, a contractor electronic device, or an insurance agent electronic device. For example, the electronic device 140 may be an insurance agent electronic device. An insurance agent may visit a roof in person and use the electronic device 140 to document an insurance claim from a homeowner, document roof data, as described elsewhere herein, and/or utilize the techniques disclosed herein to determine a roof recommendation.

Broadly speaking, the electronic device 140 may be communicatively coupled to the server(s) 120 via the network 110. Further, the server(s) 120 may be configured to perform some/all of the functionalities described herein as part of roof recommendation based upon cumulative weather damage. The server(s) 120 may include one or more processors 122, a network interface controller (NIC) 124, and a memory 126. In certain aspects, the server(s) 120 may be part of and/or otherwise operate within a cloud network or may otherwise communicate with other hardware or software components within one or more cloud computing environments to send, retrieve, or otherwise analyze data or information described herein. For example, in certain aspects of the present techniques, the computing environment 100 may comprise an on-premise computing environment, a multi-cloud computing environment, a public cloud computing environment, a private cloud computing environment, and/or a hybrid cloud computing environment, each of which are generally configured to provide a roof recommendation based upon cumulative weather damage described herein.

For example, any suitable entity (e.g., a business) offering such roof recommendation based upon cumulative weather damage may host one or more services in a public cloud computing environment (e.g., Alibaba Cloud, Amazon Web Services (AWS), Google Cloud, IBM Cloud, Microsoft Azure, etc.). The public cloud computing environment may be a traditional off-premise cloud (i.e., not physically hosted at a location owned/controlled by the business). Additionally, or alternatively, aspects of the public cloud may be hosted on-premise at a location owned/controlled by an enterprise associated with the intelligent coordination for short-term rental or lending of items. The public cloud may be partitioned using visualization and multi-tenancy techniques and may include one or more infrastructure-as-a-service (IaaS) and/or platform-as-a-service (PaaS) services.

The network 110 may comprise any suitable network or networks, including a local area network (LAN), wide area network (WAN), Internet, or combination thereof. For example, the network 110 may include a wireless cellular service (e.g., 4G, 5G, etc.). Generally, the network 110 enables bidirectional communication between the electronic device 140 and the server(s) 120. In certain aspects, the network 110 may comprise a cellular base station, such as cell tower(s), communicating to the one or more components of the computing environment 100 via wired/wireless communications based upon any one or more of various mobile phone standards, including NMT, GSM, CDMA, UMMTS, LTE, 5G, or the like. Additionally, or alternatively, the network 110 may comprise one or more routers, wireless switches, or other such wireless connection points communicating to the components of the computing environment 100 via wireless communications based upon any one or more of various wireless standards, including by non-limiting example, IEEE 802.11a/b/c/g (WIFI), Bluetooth, and/or the like.

The processor(s) 122 may include one or more suitable processors (e.g., central processing units (CPUs) and/or graphics processing units (GPUs)). The processor(s) 122 may be connected to the memory 126 via a computer bus (not depicted) responsible for transmitting electronic data, data packets, or otherwise electronic signals to and from the processor(s) 122 and the memory 126 in order to implement or perform the computer-readable instructions, methods, processes, elements or limitations, as illustrated, depicted, or described for the various flowcharts, illustrations, diagrams, figures, and/or other disclosure herein. The processor(s) 122 may interface with the memory 126 via a computer bus to execute an operating system (OS) and/or computing instructions contained therein, and/or to access other services/aspects. For example, the processor(s) 122 may interface with the memory 126 via the computer bus to create, read, update, delete, or otherwise access or interact with the data stored in the memory 126 and/or a database 130. One or more processors 152 of the external server 150 and one or more processors 162 of the one or more sensors 160 may include properties and/or functionalities similar to processor(s) 122 and interface with a memory 156 and a memory 166, respectively.

The memory 126 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memory 126 may store an operating system (OS) (e.g., Microsoft Windows, Linux, UNIX, etc.) capable of facilitating the functionalities, apps, methods, or other software as discussed herein. The memory 126 may store a plurality of computing modules 123, including an input/output (I/O) module 121, a recommending module 128, and a machine learning (ML) module 127, implemented as respective sets of computer-executable instructions (e.g., one or more source code libraries, trained machine learning (ML) models such as neural networks, convolutional neural networks, etc.) as described herein.

The computing modules 123 may store determined and/or generated information in the memory 126 and/or the database 130. Furthermore, the memory 126 and/or database 130 may store any information related to the techniques discussed herein. For example, the memory 126 and/or database 130 may store: (i) roof data (e.g., age data, roof material data, pitch data, orientation data, imagery data, insurance data historical roof data, neighbor roof data, factors of roof degradation, geolocation data, sensor data), (ii) weather data (e.g., weather type data, temperature data, atmospheric pressure data, humidity data, duration data, weather severity data, weather acidity data, forecasted weather data, sensor data), (iii) user data (e.g., user geolocation, user credentials, sensor data associated with the user), etc. In some aspects, the computing environment 100 may include the database 130. Database 130 may be a relational database, such as Oracle, DB2, MySQL, a NoSQL based database, such as MongoDB, or another suitable database. The database 130 may store data and be used to train and/or operate one or more ML/AI models, chatbots, and/or voice bots.

In general, a computer program or computer based product, application, or code (e.g., module(s), such as recommending module 128, model(s), such as ML models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 122 (e.g., working in connection with the respective operating system in the memory 126) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

In certain aspects, the computing modules 123 may include a recommending module 128 comprising a set of computer-executable instructions that are executable by the processor(s) 122 and cause roof recommendation based upon cumulative weather damage. The recommending module 128 may also include a plurality of models trained to compute outputs to be utilized by the computing environment 100. Models and exemplary embodiments are discussed in further detail elsewhere herein. However, it should be understood that the recommending module 128 may include any suitable set of instructions for roof recommendation based upon cumulative weather damage, such as a machine learning (ML) model configured to receive inputs from the computing environment 100 and output data utilized by the computing environment 100.

In operation, the recommending module 128 may determine a roof recommendation and generate a roof recommendation signal indicating the roof recommendation. For example, as described elsewhere herein, the recommending module 128 may determine a roof recommendation based upon roof data and weather data, determine cumulative impact of weather on a roof, determine a weather severity score, determine a predicted lifespan of a roof, etc. Exemplary machine learning techniques are further discussed in FIG. 1B and FIG. 1C.

In one aspect, the computing modules 123 may include an ML module 127. The ML module 127 may include ML training module (MLTM) 129 and/or ML operation module (MLOM) 125. In some embodiments, at least one of a plurality of ML methods and algorithms may be applied by the ML module 127, which may include, but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of ML, such as supervised learning, unsupervised learning, and reinforcement learning.

In some embodiments, a machine learning chatbot may be configured to utilize artificial intelligence and/or machine learning techniques. For instance, the machine learning chatbot may be a ChatGPT chat bot. The machine learning chatbot may employ supervised or unsupervised machine learning techniques, which may be followed by and/or used in conjunction with, reinforced or reinforcement learning techniques. The machine learning chatbot may employ the techniques utilized for ChatGPT.

In certain aspects, the ML based algorithms may be included as a library or package executed on server(s) 120. For example, libraries may include the TensorFlow based library, the Pytorch library, and/or the scikit-learn Python library.

In one embodiment, the ML module 127 employs supervised learning, which involves identifying patterns in existing data to make predictions about subsequently received data. Specifically, the ML module 127 is "trained" (e.g., via MLTM 129) using training data, which includes example inputs and associated example outputs. Based upon the training data, the ML module 127 may generate a predictive function which maps outputs to inputs and may utilize the predictive function to generate ML outputs based upon data inputs. The exemplary inputs and exemplary outputs of the training data may include any of the data inputs or ML outputs described above. In the exemplary embodiments, a processing element may be trained by providing it with a large sample of data with known characteristics or features.

In another embodiment, the ML module 127 may employ unsupervised learning, which involves finding meaningful relationships in unorganized data. Unlike supervised learning, unsupervised learning does not involve user-initiated training based upon example inputs with associated outputs. Rather, in unsupervised learning, the ML module 127 may organize unlabeled data according to a relationship determined by at least one ML method/algorithm employed by the ML module 127. Unorganized data may include any combination of data inputs and/or ML outputs as described above.

In yet another embodiment, the ML module 127 may employ reinforcement learning, which involves optimizing outputs based upon feedback from a reward signal. Specifically, the ML module 127 may receive a user-defined reward signal definition, receive a data input, utilize a decision-making model to generate the ML output based upon the data input, receive a reward signal based upon the reward signal definition and the ML output, and alter the decision-making model so as to receive a stronger reward signal for subsequently generated ML outputs. Other types of ML may also be employed, including deep or combined learning techniques.

The MLTM 129 may receive labeled data at an input layer of a model having a networked layer architecture (e.g., an artificial neural network, a convolutional neural network, etc.) for training the one or more ML models. The received data may be propagated through one or more connected deep layers of the ML model to establish weights of one or more nodes, or neurons, of the respective layers. Initially, the weights may be initialized to random values, and one or more suitable activation functions may be chosen for the training process. The present techniques may include training a respective output layer of the one or more ML models. The output layer may be trained to output a prediction, for example.

The MLOM 125 may comprise a set of computer-executable instructions implementing ML loading, configuration, initialization and/or operation functionality. The MLOM 125 may include instructions for storing trained models (e.g., in the database 130). As discussed, once trained, the one or more trained ML models may be operated in inference mode, whereupon when provided with de novo input that the model has not previously been provided, the model may output one or more predictions, classifications, etc., as described herein.

In certain aspects, the computing modules 123 may include an input/output (I/O) module 121, comprising a set of computer-executable instructions implementing communication functions. The I/O module 121 may include a communication component configured to communicate (e.g., send and receive) data via one or more external/network port(s) to one or more networks or local terminals, such as the network 110 and/or the electronic device 140 (for rendering or visualizing) described herein. In certain aspects, the server(s) 120 may include a client-server platform technology such as ASP.NET, Java J2EE, Ruby on Rails, Node.js, a web service or online API, responsive for receiving and responding to electronic requests.

The I/O module 121 may further include or implement an operator interface configured to present information to an administrator or operator and/or receive inputs from the administrator and/or operator. An operator interface may provide a display screen. The I/O module 121 may facilitate I/O components (e.g., ports, capacitive or resistive touch sensitive input panels, keys, buttons, lights, LEDs), which may be directly accessible via, or attached to, the server(s) 120 or may be indirectly accessible via or attached to the electronic device 140. According to an aspect, an administrator or operator may access the server(s) 120 via an electronic device (e.g., 140) to review information, make changes, input training data, initiate training via the MLTM 129, and/or perform other functions (e.g., operation of one or more trained models via the MLOM 125).

In some aspects, the computing environment 100 may include an external server 150. The external server 150 may include one or more processors 152, an NIC 154, and a non-transitory computer-readable memory 156. The external server 150 may be a publicly accessible server, such as the National Weather Service (NWS) or the National Institute of Standards and Technology (NIST), wherein the memory 156 stores respective information of weather data (e.g., historical weather data, forecasted weather data, climate change, etc.) and roof data (e.g., materials data repository, weathering data on materials, etc.). In some aspects, the memory may store computer readable instructions that when executed by the processors 152 cause the external server 150 to access weather data and/or roof data besides weather and/or roof data stored on the memory 156. In general, the external server 150 may contain any data utilized by the server(s) 120, the sensor(s) 160, and/or the electronic device 140. Accordingly, the external server 150 may be communicatively coupled to the server(s) 120, the sensor(s) 160, and/or the electronic device 140 via the network 110. The external server 150 may be an individual server, a group (e.g., cluster) of multiple servers communicatively coupled, a group of multiple servers not communicatively coupled, or another suitable type of computing device or system (e.g., a collection of computing resources). For example, server 150 may be a Wi-Fi enabled server. Further, the external server 150 may be operated by one or more entities, including and/or not including the operating entity of the server(s) 120.

In some aspects, the computing environment 100 may include a plurality of sensor(s) 160. The sensor(s) 160 may include instruments (not shown) capable of translating an environment the sensor(s) 160 exist within into a computer-readable signal. The sensor(s) 160 may include one or more processors 162, an NIC 164, and a non-transitory computer-readable memory 166. The sensor(s) 160 may be proximate to a roof and monitor the roof for factors of roof degradation, as described elsewhere herein and FIG. 3. In some aspects, the sensor(s) 160 may monitor a roof by generating sensor data (e.g., (i) roof data, such as imagery data, pitch data, roof material data, geolocation data, (ii) weather data, such as temperature data, humidity data, weather acidity data, etc.). The sensor data may be stored on the memory 166 and/or sent to the server(s) 120 via the network 110 as sensor data, roof data and/or weather data. Sensor data may include raw/unprocessed roof data and/or weather data. Accordingly, sensor data may be processed by the one or more processors 162, the server(s) 120, and/or other suitable components. Roof data and/or weather data obtained/received from the sensor(s) 160 may be tagged as being from the sensor(s) 160. In this regard, the recommending module 128 and/or ML module 127 may apply different weight to roof data and/or weather data obtained/received from a sensor (e.g., 160) compared to roof data and/or weather data obtained/received from other sources (e.g., external server 150, electronic device 140, etc.).

In some aspects, the recommending module 128 may be configured to (i) receive roof data from the electronic device 140 and/or the database 130 indicating at least a geolocation of a roof, (ii) obtain weather data for the geolocation of the roof indicating the weather over a period of time at least near the geolocation, (iii) determine a roof recommendation based upon the roof data and the weather data, and (iv) generate a roof recommendation signal indicating the roof recommendation. For example, the recommending module 128 may receive roof data, such as geolocation data indicating a geolocation of a roof and/or an electronic device (e.g., 140) associated with a roof, and obtain weather data, such as weather type data indicating a type of weather event(s), for the geolocation of the roof indicating the weather over a period of time at least near the geolocation. The period of time may be, for example, 2 weeks, 2 years, 22 years, etc. Further, the geolocation may be, e.g., a point within a city's limits, a city's limits, a county's limits, etc. For example, the weather over a period of time at least near the geolocation (e.g., a point) may include weather which occurred within a 2 years period within Cook County, IL. As used herein, the term "near" should be understood to mean a measurement of distance from the geolocation whereby the weather events occurring within the distance directly, or indirectly, impact and/or influence the roof associated with the geolocation, as discussed further in FIG. 4. Continuing the example, the recommending module 128 may determine a roof recommendation based upon the weather which occurred within the 2 years period in Cook County. The roof recommendation may indicate e.g., the roof should be inspected, a section of the roof should be repaired, such as nail holes resealed, a projected lifespan of the roof, etc., as discussed further elsewhere herein.

Exemplary Machine Learning Techniques

Figure 1B:
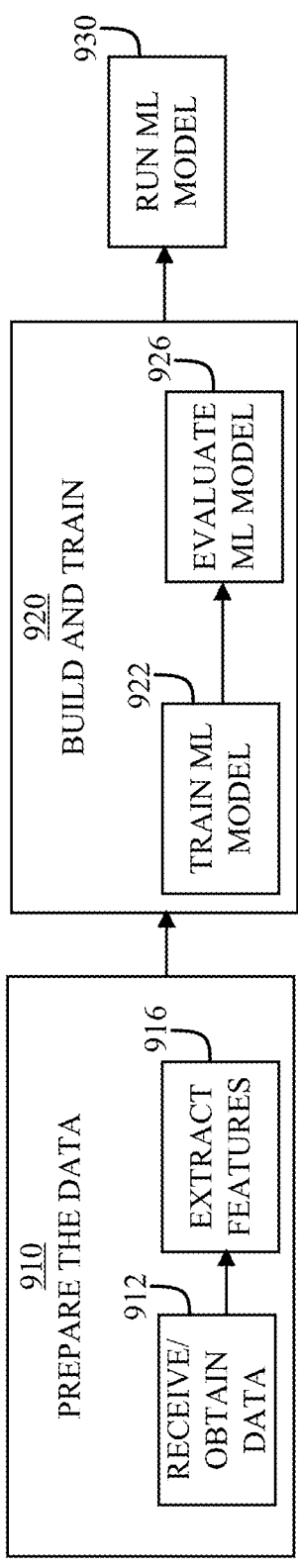
FIG. 1B illustrates an exemplary block diagram of an example machine learning modeling method for training and evaluating a machine algorithm, in accordance with various embodiments.

Broadly speaking, recommending module 128, MLTM 129, and/or any other suitable component may train a machine learning model to, for example, determine a roof recommendation, identify factors of roof degradation, determine a cumulative impact of weather, and/or determine other information related to determining a roof recommendation (e.g., an age of a roof, etc.). FIG. 1B is a block diagram of an exemplary machine learning modeling method 900 for training and evaluating a machine learning model (e.g., a machine learning algorithm), in accordance with various embodiments. In some embodiments, the model "learns" an algorithm capable of performing the desired function, such as determining a roof recommendation based upon cumulative weather. It should be understood that the principles of FIG. 1B may apply to any machine learning algorithm discussed herein.

At a high level, the machine learning modeling method 900 includes a block 910 to prepare the data, a block 920 to build and train the model, and a block 930 to run the model.

Block 910 may include sub-blocks 912 and 916. At block 912, the recommending module 128 and/or the MLTM 129 may receive training information (e.g., roof data, weather data) to train the machine learning algorithm. The training information may include any information of a roof and/or weather (or weather related) event. Examples of training roof information include (i) training age data associated with an age of a roof, (ii) training roof material data associated with one or more materials of a roof, (iii) training pitch data associated with one or more pitches of a roof, (iv) training orientation data associated with an orientation of a roof, (v) training imagery data associated with one or more images of a roof, (vi) training insurance data associated with one or more insurance claims associated with a roof, (vi) training historical roof data associated with historic roof data associated with a roof, (vii) training neighbor roof data associated with roof data of a plurality of roofs near a geolocation, (viii) training geolocation data, (xvii) training factors of roof degradation, (xx) training predicted lifespan, and (xxi) training roof recommendation. Examples of weather data include: (ix) training weather type data, (x) training temperature data, (xi) training atmospheric pressure data, (xii) training humidity data, (xiii) training duration data, (xiv) training weather severity data, (xv) training weather acidity data, (xvi) training forecasted weather data, (xviii) training weather severity score(s), and (xix) training cumulative impact of weather.

In some embodiments, the machine learning algorithm may be trained using the above (i)-(xv) as inputs to the machine learning model (e.g., also referred to as independent variables, or explanatory variables), and the above (xvii)-(xxi) are used as the outputs of the machine learning model (e.g., also referred to as a dependent variables, or response variables). Put another way, each of the above (i)-(xvi) may have an impact on (xvii)-(xxi); and the machine learning algorithm may be trained to find this impact.

In some scenarios, the data includes training roof recommendations. In some such scenarios, the machine learning algorithm may be directly trained to predict roof recommendations using the training roof recommendations.

However, in other scenarios, the training roof recommendations may not be available (or there is not sufficient data available to train the machine learning algorithm). As such, in some embodiments, the machine learning algorithm may be trained to determine roof recommendations via the (xvii) training factors of roof degradation, (xviii) training weather severity score(s), (xix) training cumulative impact of weather, or (xx) training predicted lifespan. For example, the machine learning algorithm may be trained to predict the cumulative impact of weather (e.g., based upon (i)-(xvi), (xvii-xviii), etc.); then, further techniques may use the predicted cumulative impact of weather to determine the roof recommendation. For instance, the predicted cumulative impact of weather (e.g., the output of the machine learning algorithm), may be input into a second model that determines cumulative impact of weather and/or other factors, as will be explained further below. Such embodiments therefore present a technical solution to a technical problem; that is, such embodiments solve the technical problem of how to train a machine learning algorithm to determine roof recommendation when roof recommendations is scarce or not available at all.

Figure 1C:
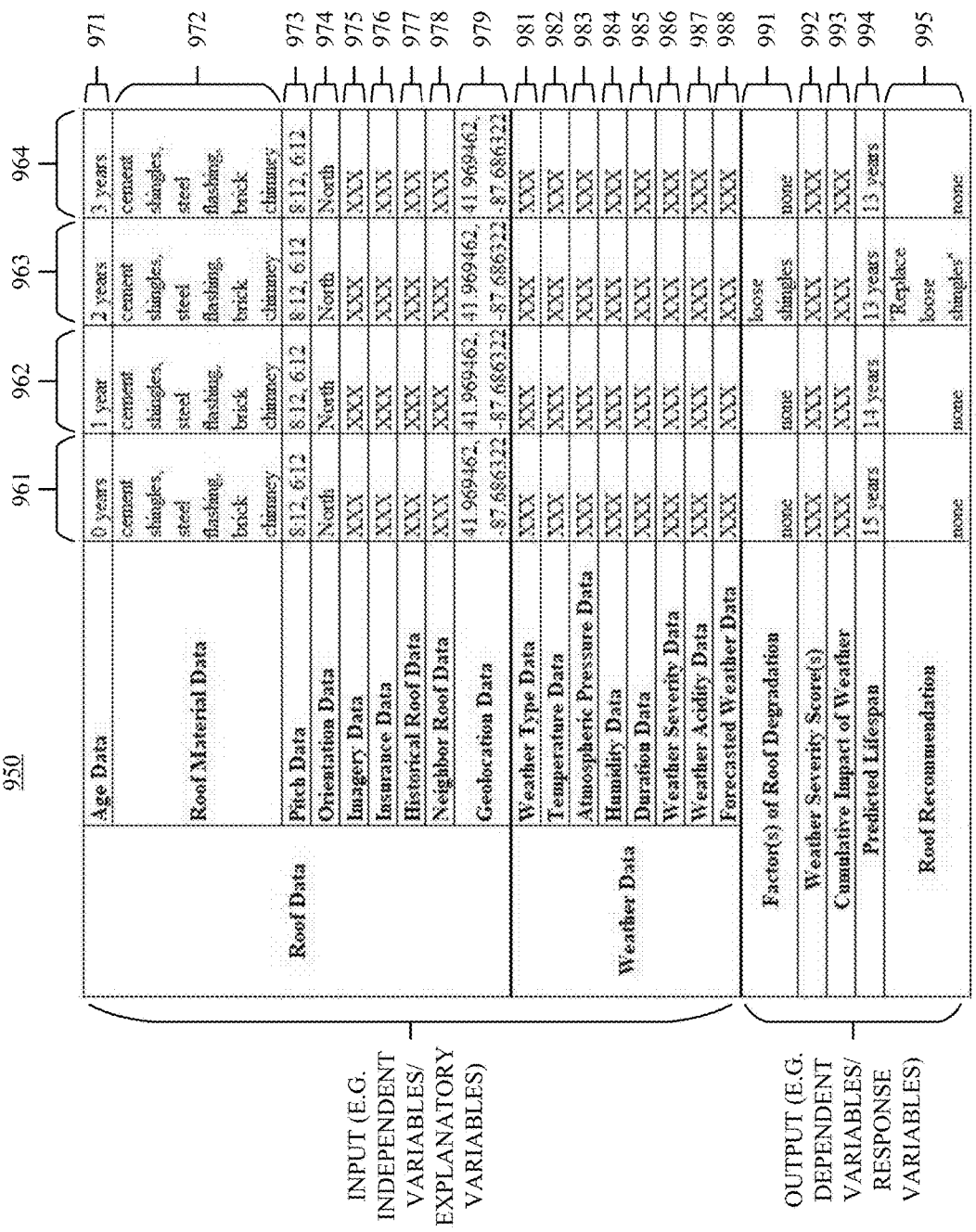
FIG. 1C illustrates an exemplary table of training information.

In some embodiments, the training information may be held in the form of a table, such as the example table 950 illustrated in the example of FIG. 1C. The illustrated example table 950 includes first time point 961, second time point 962, third time point 963, fourth time point 964, age data 971, roof material data 972, pitch data 973, orientation data 974, imagery data 975, insurance data 976, historical roof data 977, neighbor roof data 978, geolocation data 979, weather type data 981, temperature data 982, atmospheric pressure data 983, humidity data 984, duration data 985, weather severity data 986, weather acidity data 987, forecasted weather data 988, factors of roof degradation 991, weather severity score 992, cumulative impact of weather 993, predicted lifespan 994, and roof recommendation 995. It should be appreciated that the data table 950 is one example data structure associated with the training information. In this exemplary data table, data is structured in four consecutive time points (961, 962, 963, 964) with values of independent and dependent variables at and/or up to each respective time point. Independent variables, such as geolocation data, pitch data, historical roof data, may be identical values at each time point and unlikely to change due to the data being represented (e.g., a roof is unlikely to move once installed). Independent variables, such as imagery data, temperature data, duration data, geolocation data, may or may not be identical at each time point due to the data being represented (e.g., temperature may remain the same or change, a geolocation of a mobile home with a roof may remain the same or change). It should also be appreciated the data of each independent variable and/or dependent variable may be represented in a table in any suitable format(s), as described elsewhere herein. It should be understood that dependent variables may be based upon independent variables and/or dependent variables, such as when machine learning models use more than one layer, as discussed elsewhere herein.

In other examples, the server(s) 120 may implement one or more alternate data structures that represent the data, as described elsewhere herein. For example, the data structure may include two or more time points (e.g., 961, 962) representing the data obtained and/or received at and/or up to the time point. For example, the data structure may include a series of time points in 15-minute intervals and temperature data, for example, may be an average of the temperature during the 15 minutes (e.g., over the period of 15 minutes) and/or the temperature at the specific 15-minute time point. Additionally, in some embodiments, the server 120 may normalize one or more of the input variables to, for example, a scale of 0 to 1.

In some embodiments, training the machine learning algorithm based upon less information (e.g., three or less of the inputs (i)-(xvi), three or less of the inputs (i)-(xxi)) has a technical advantage. Namely, the roof recommendation may be calculated faster because there is less data to consider.

In other embodiments, training the machine learning algorithm based upon more information (e.g., four or more of the inputs (i)-(xv), four or more of the inputs (i)-(xxi)) has a technical advantage. Namely such embodiments may have the advantage that the roof recommendation may be more accurate because it uses more data points in its determination.

Generally, the machine learning model is trained to identify how each of the input variables may influence the output variables. For example, the less robust roof materials used to install a roof, the more it may be damaged by weather events, thus resulting in the machine learning model outputting a shorter predicted lifespan and/or a more frequent roof recommendations indicating the roof needs inspection.

The factors of roof degradation may also influence the roof recommendation output by the machine learning model. In some embodiments the factors of roof degradation is based upon roof data, such as imagery data.

The weather severity score may also influence the roof recommendation output by the machine learning model. In some embodiments, the weather severity score is based upon weather data. In certain embodiments, the weather severity score is based upon weather data and roof data. For example, weather events may be more severe to a roof depending on the roof.

The cumulative impact of weather on a roof may also influence the roof recommendation output by the machine learning model. In some embodiments, the cumulative impact of weather is based upon weather data. In various embodiments, the cumulative impact of weather is based upon weather data and roof data. For example, cumulative weather events may impact a roof more or less depending on characteristics of the roof. In certain embodiments, the cumulative impact of weather is based upon weather severity scores. For example, more than one weather event may be determined by the same or different machine learning model and the weather severity score of each weather event may influence the cumulative impact of weather on a roof.

The predicted lifespan of a roof may also influence the roof recommendation output by the machine learning model. In some embodiments, the predicted lifespan is based upon (i) roof data, such as age data, roof material data, insurance data, neighbor roof data, etc., and weather data. In some embodiments, the predicted lifespan is based upon factors of roof degradation. For example, a roof with more factors of roof degradation may have a shorter predicted lifespan. In some embodiments, the predicted lifespan may be based upon cumulative impact of weather. For example, a roof having experienced a greater cumulative impact of weather may have a shorter predicted lifespan.

In some embodiments, roof data may include factors of roof degradation, predicted lifespan, and/or roof recommendation. In some embodiments, weather data may include weather severity score, and cumulative impact of weather.

It should be appreciated that while the foregoing sets out some input factors to the machine learning model, in other embodiments, additional, alternate, or fewer factors are used. In some embodiments, an input to the machine learning model trained at block 920 may be the output of another machine learning model trained to produce a metric characterizing weather data and/or roof data. For example, the more severe a weather event (e.g., wind speed, duration, lightning strikes), the greater the weather severity score. In this example, an output of machine learning model trained to produce a weather severity score may be an input to the machine learning model trained at block 920.

At block 916 the machine learning training application (MLTM) 129 may extract features from the received data, and put them into vector form. For example, the features may correspond to the values associated with the training data used as input factors. Furthermore, at block 916, the received data may be assessed and cleaned (processed), including handling missing data and handling outliers. For example, missing records, zero values (e.g., values that were not recorded), incomplete data sets (e.g., for scenarios when data collection was not completed), outliers, and inconclusive data may be removed.

Block 920 may include sub-blocks 922 and 926. At block 922, the machine learning (ML) model is trained (e.g. based upon the data received from block 910). In some embodiments where training roof recommendations are included in the training information, the ML model "learns" an algorithm capable of calculating or predicting the target feature values (e.g., determining a roof recommendation) given the predictor feature values. However, in other embodiments where training roof recommendations are not available, the machine learning algorithm may learn to instead predict, e.g., a cumulative impact of weather (and/or other values upon which a roof recommendation is based). The predicted cumulative impact of weather may then in turn be used to determine the roof recommendation. In one such working example, the machine learning algorithm is trained by creating multiple regression models to predict the cumulative impact of weather, and then selecting the best regression model (e.g., the regression model with the least error, etc.). In these embodiments, the output of this first machine learning algorithm (e.g., the cumulative impact of weather) may then input into a second model (e.g., a second machine learning algorithm, a regression model, a lookup table, etc.) to determine the roof recommendation. For example, the model may be a machine learning algorithm that has been trained to determine roof recommendation(s) from cumulative impact of weather values and/or other inputs.

Additionally, the machine learning model may include multiple layers. For example, in a first layer, the machine learning model may be configured to determine two or more weather severity scores (e.g., 992), each of a respective weather event indicating e.g., a likelihood a roof may require inspection and/or maintenance, based upon weather data (981-988). In this example, the second layer may then be configured to analyze the weather severity scores (e.g., 992) and determine a cumulative impact of weather 993 on the roof. Further in this example, the third layer may then be configured to analyze the cumulative impact of weather 993 on the roof and determine a roof recommendation 995. As another example, the factors of roof degradation 991 and/or the predicted lifespan 994 may also be the outputs of a machine learning model trained to output the roof recommendation 995.

At block 926, the MLTM 129 evaluates the machine learning model, and determines whether or not the machine learning model is ready for deployment.

Further regarding block 926, evaluating the model sometimes involves testing the model using testing data or validating the model using validation data. Testing/validation data typically includes both predictor feature values and target feature values (e.g., including known inputs and outputs), enabling comparison of target feature values predicted by the model to the actual target feature values, enabling one to evaluate the performance of the model. This testing/validation process is valuable because the model, when implemented, will generate target feature values for future input data that may not be easily checked or validated.

Thus, it is advantageous to check one or more accuracy metrics of the model on data for which the target answer is already known (e.g., testing data or validation data, such as data including training data associated with roof recommendations), and use this assessment as a proxy for predictive accuracy on future data. Exemplary accuracy metrics include key performance indicators, comparisons between historical trends and predictions of results, cross-validation with subject matter experts, comparisons between predicted results and actual results, etc.

At block 930, the MLOM 125 and/or recommending module 128 runs the ML model. For example, weather data may be routed to the trained machine learning algorithm to determine the roof recommendation.

Roof Data

In some aspects, roof data includes one or more of: (i) age data associated with an age of the roof, (ii) roof material data associated with one or more materials of the roof, (iii) pitch data associated with one or more pitches of the roof, (iv) orientation data associated with an orientation of the roof, (v) imagery data associated with one or more images of the roof, (vi) insurance data associated with one or more insurance claims associated with the roof, (vi) historical roof data associated with historic roof data associated with the roof, or (vii) neighbor roof data associated with roof data of a plurality of roofs near the geolocation. For example, a homeowner (user) may know a year the roof was installed, a roof material used for the roof, and an insurance plan which covers costs of roof maintenance and/or damage. The user may input the information (roof data) into the electronic device 140, e.g., via a display, and the electronic device 140 may store the information as roof data in the memory of the electronic device 140 and/or send the roof data to the server(s) 120. Accordingly, the recommending module 128 may receive roof data from the electronic device 140. Additionally, or alternatively, roof data may be received/obtained from the external server(s) 150, the sensor(s) 160, the memory 126, the database 130, and/or direct input via the I/O module 121. Further, roof data may be generated/determined by the recommending module 128, the ML module 127, and/or any suitable component as discussed by the techniques herein.

In some aspects, age data may indicate an age associated with the roof, such as when the roof was installed, section(s) of the roof were installed, and/or when the roof was last inspected and/or maintained. For example, a homeowner may use the electronic device 140 to indicate, e.g., via a display of the electronic device 140, a year a roof was installed. The electronic device 140 may store the year as age data and transmit the age data as roof data to the memory 126 via the network 110. Subsequently, the recommending module 128 may determine a predicted lifespan of the roof based upon the age data (i.e., roof data), for example.

In some aspects, roof material data may indicate one or more materials used to install the roof (i.e., roof materials). Generally, roof material data may indicate the materials use to install the roof and the components the materials make up. Materials the associated components may include composition of a type of shingle (e.g., cement, slate, rubber, wood), type of flashing (e.g., copper, stainless steel), type of nails (e.g., steel, vinyl coated, phosphorus coated), type of sealant (e.g., tar, rubber, silicon, latex, vinyl, adhesive), miscellaneous structures (e.g., skylight, chimney, gutters), etc. In some aspects, the recommending module 128 may utilize roof material data to determine a roof recommendation. For example, the memory 126 may include a machine learning model wherein a first layer is trained to identify one or more roof materials from imagery data of a roof, store the identified roof materials as roof material data in the memory 126, and associate the roof material data with the roof associated with the imagery data. A second layer of the machine learning model may be trained to determine a weather severity score based upon weather data and the roof material data. Additionally, or alternatively, the second layer of the machine learning model may be trained to obtain supplemental material data associated with the identified roof material(s) from the external server 150, such as stress tests, erosion metrics, etc., as discussed elsewhere herein. A third layer of the machine learning model may be trained to determine a roof recommendation based upon the weather severity scores.

In some aspects, the server(s) 120 may obtain roof material data from the external server 150. Continuing the previous example, the external server 150 may be a publicly available server for the NIST. Accordingly, the memory 156 may include data regarding materials used to install a roof (i.e., roof material data). The roof material data may include empirical data indicating physical properties of a material (i.e., roof material); physical properties such as Ultraviolet (UV) light absorption rate, melting point, strength, erosion rate, stress tests, etc. Accordingly, the physical properties of a roof material may indicate the durability of a roof material to weather (or weather related) events. The MLOM 125 may execute the machine learning model of the previous example and roof data may be stored in the memory 126 indicating roof material(s) of the respective roof. The recommending module 128 may obtain additional roof material data from the external server 150 corresponding to the roof material(s) indicated by the roof material data stored on the memory 126, and subsequently determine a roof recommendation based upon the roof material data.

In some aspects, pitch data may indicate one or more pitches of the roof. One having ordinary skill in the art may appreciate the pitch of a roof influencing the severity of micro-damages to a roof. For example, a flat roof with a 0:12 pitch may accumulate snow in greater amounts and have zero drainage compared to a steeper roof with an 8:12 pitch which allows snow to slip off and melting snow drain into a gutter. In some aspects, pitch data may include empirical data of a plurality of roofs with a plurality of pitches associated with micro-damages and/or weather data. For example, pitch data may include the pitches of five structures, the micro-damages of each structure (such as the cumulative damage of each structure), and/or the associated weather data indicating the weather (or weather related) events the five structures endured. Accordingly, pitch data, among other roof data described herein, may be used by MLTM 129 to train a machine learning model for (i) determining one or more pitches of a roof, and/or (ii) determining a roof recommendation based upon pitch data.

Figure 2A:
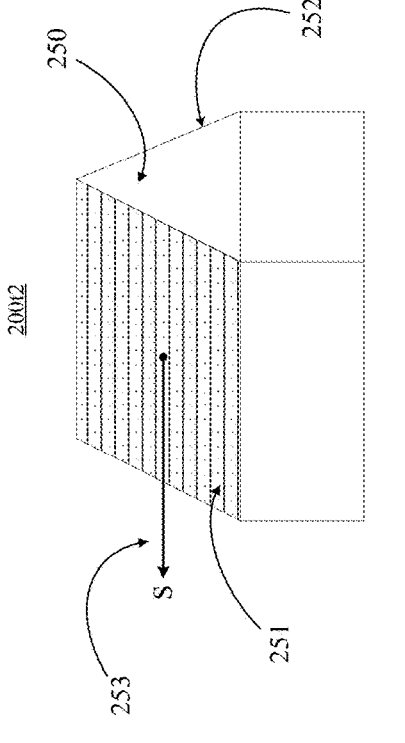
FIG. 2A illustrates an exemplary structure, a roof undamaged by weather (or weather related) events, and a vertical rise and horizontal run of the roof indicating pitch.

Consequently, the machine learning model may be able to predict the pitch of a roof e.g., from imagery data, as discussed elsewhere herein, and/or a roof recommendation specific to the pitch of the roof and the predicted micro-damages which may have degraded the roof as a result. FIG. 2A further illustrates and discusses pitch.

In some aspects, pitch data may indicate a surface area of a roof and/or sections of the roof. For example, pitch data may indicate a two "roofing square" roof with a pitch of 3:12. A "roofing square" is 100 square feet. In this example, the pitch data may indicate a roof with a pitch of 12 horizontal yards for every three yard vertical rise and an area of 200 square feet.

Figure 2B:
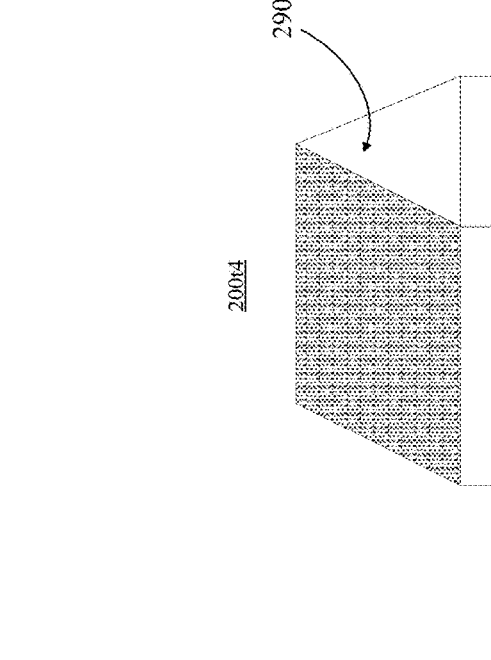
FIG. 2B illustrates an exemplary structure, orientation of the structure, and cumulative damage caused by weather (or weather related) events.

In some aspects, orientation data may indicate an orientation of the roof relative to a reference metric, such as a cardinal direction. The orientation of a roof may influence the rate at which a roof degrades. For example, a roof 250, oriented with a first roof field 251 facing South, as depicted in FIG. 2B, may degrade more quickly (experience more micro-damages) than a roof oriented with a first roof field facing East. This may be due to the direction of wind (i.e., weather, weather event) at least near the geolocation of the roof. Additionally, or alternatively, this may be due to astronomical/meteorological characteristics such as the amount of solar radiation the roof is exposed to because of a path of a sun in the sky. Accordingly, recommending module 128 may determine a roof recommendation based upon the orientation data.

In some aspects, imagery data may include one or more images of the roof. Imagery data may include photo(s), video(s), 3D scan(s), heat scan(s), etc. Imagery data may be represented in suitable file formats for included data, such as JPEG, PNG, MP4, XML, etc. For example, the electronic device 140 may include an imaging device (not shown) to capture imagery data. A user may use the electronic device 140 to take a photo of a roof to generate imagery data. The imagery data may be stored on the memory of the electronic device 140 and/or transmitted to the database 130 via the network 110 and the server(s) 120. In some aspects, imagery data may indicate one or more factors of roof degradation, as discussed further elsewhere herein and in FIG. 3.

In some aspects, wherein roof data includes imagery data associated with one or more images of the roof, the recommending module 128 may be configured to (i) process the one or more images, (ii) identify one or more factors of roof degradation present in one or more of the one or more images, and (iii) generate roof data based upon the one or more factors of roof degradation. For example, a weather event may have blown debris, such as sticks and leaves, onto a roof. The debris may indicate the roof sustained micro-damages from a weather event (e.g., rain, wind) and/or weather related event (e.g., debris impacting the roof). Subsequent to (and/or in response to a detection of) the weather event, the recommending module 128 may transmit a recommendation signal to the electronic device 140. The recommendation signal may indicate instructions for the user to use an imaging device, such as the imaging device included in the electronic device 140 of the previous example, to capture imagery data of the roof. In some aspects, the recommending module 128 may obtain the imagery data from one or more processors of the electronic device 140. Continuing the example, the recommending module 128 may process one or more images of the imagery data by executing a machine learning model trained to, e.g., identify objects, such as debris on a roof, in one or more of the one or more images. The same or different machine learning model may further identify the identified debris as a factor of roof degradation present in one or more of the one or more images. The recommending module 128 may subsequently generate roof data indicating, e.g., the imagery data includes factors of roof degradation.

In some aspects, insurance data may include information associated with one or more insurance claims associated with the roof. For example, a homeowner may file an insurance claim with their insurance plan for mold in the attic rafters of their home, a factor of roof degradation signaling the roof is not preventing moisture from entering the home. The insurance claim may include information describing the damage (e.g., the type of mold, the surface area of the attic the mold is present, etc.), a location of the home, repairs made to fix the damage, a year the damage was repaired, a company who repaired the damage, etc. Additionally, or alternatively, insurance data may include information associated with an insurance plan associated with the roof and/or structure. For example, the information may include when the insurance plan began, inspection report(s) by insurance agent(s) and/or inspectors, etc. In some aspects, the recommending module 128 may determine a roof recommendation based upon insurance data. For example, wherein insurance data includes an insurance claim regarding water damage water damage to the inside of a home due to a leaking roof, the recommending module 128 may determine a roof recommendation to have the roof inspected/maintained based upon the insurance data and/or the weather data.

In some aspects, the insurance data may be obtained/received from an external server (e.g., 150) and/or database (e.g., 130) belonging to an insurance company associated with the insurance plan. For example, the recommending module 128 may obtain insurance data from external server 150 owned and/or operated by an insurance company covering a roof under an associated insurance plan. Insurance data may further include any information associated with one or more insurance plans associated with a plurality of roofs near the roof, such as the plurality of roofs included in neighbor roof data, as further discussed herein.

In some aspects, historical roof data may include historic roof data associated with the roof. In the lifespan of a roof, one or more users may, e.g., own the roof/property, manage the roof/property, inspect the roof/property, etc. Accordingly, roof data determined, received, and/or obtained during periods of time prior to an ownership by a present owner (e.g., user), such as roof data determined, received, and/or obtained utilizing the techniques presented herein, may be associated with the roof as historic roof data. For example, a roof may be associated with a first geolocation, a first electronic device (e.g., 140), and roof data stored in the database 130. Subsequently, a second electronic device (e.g., 140) may be associated with a second geolocation (e.g., the first geolocation or sufficiently similar geolocation) indicating the roof data obtained from the second electronic device is further associated with the roof of the first device. Consequently, some or all of the roof data stored in database 130 associated with the first electronic device, may be stored in database 130 as historical roof data. In this example, the first electronic device may be used by a first homeowner who sells the property to a second homeowner who subsequently uses the second electronic device. In another example, the first electronic device may be used by a property manager and the second electronic device used by an insurance agent.

In some aspects, the geolocation may include GPS coordinates (e.g., obtained by an electronic device 140), one or more postal addresses (e.g., obtained by an electronic device

140, indicated by insurance data), etc. For example, an apartment complex (structure) may include multiple postal addresses under a roof. FIG. 1C illustrates the geolocation data represented in a data structure as GPS coordinates.

Figure 3:
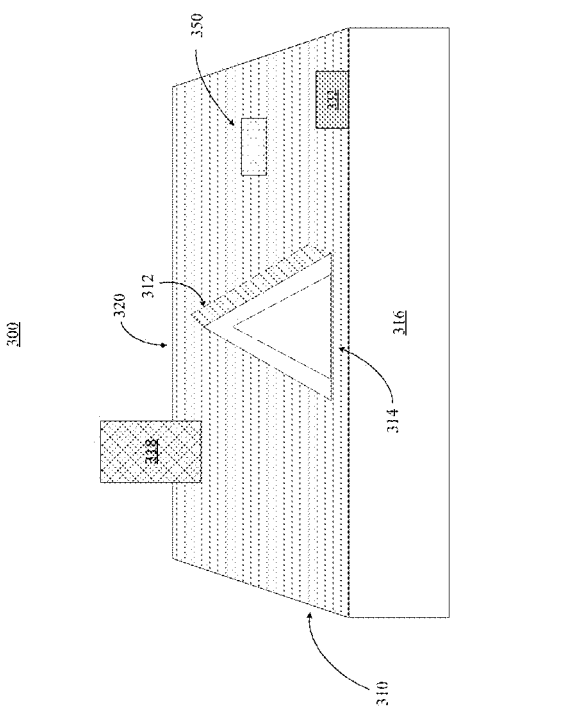
FIG. 3 illustrates an exemplary implementation of a plurality of sensors proximate to a roof of a structure and factors of roof degradation.
Figure 4:
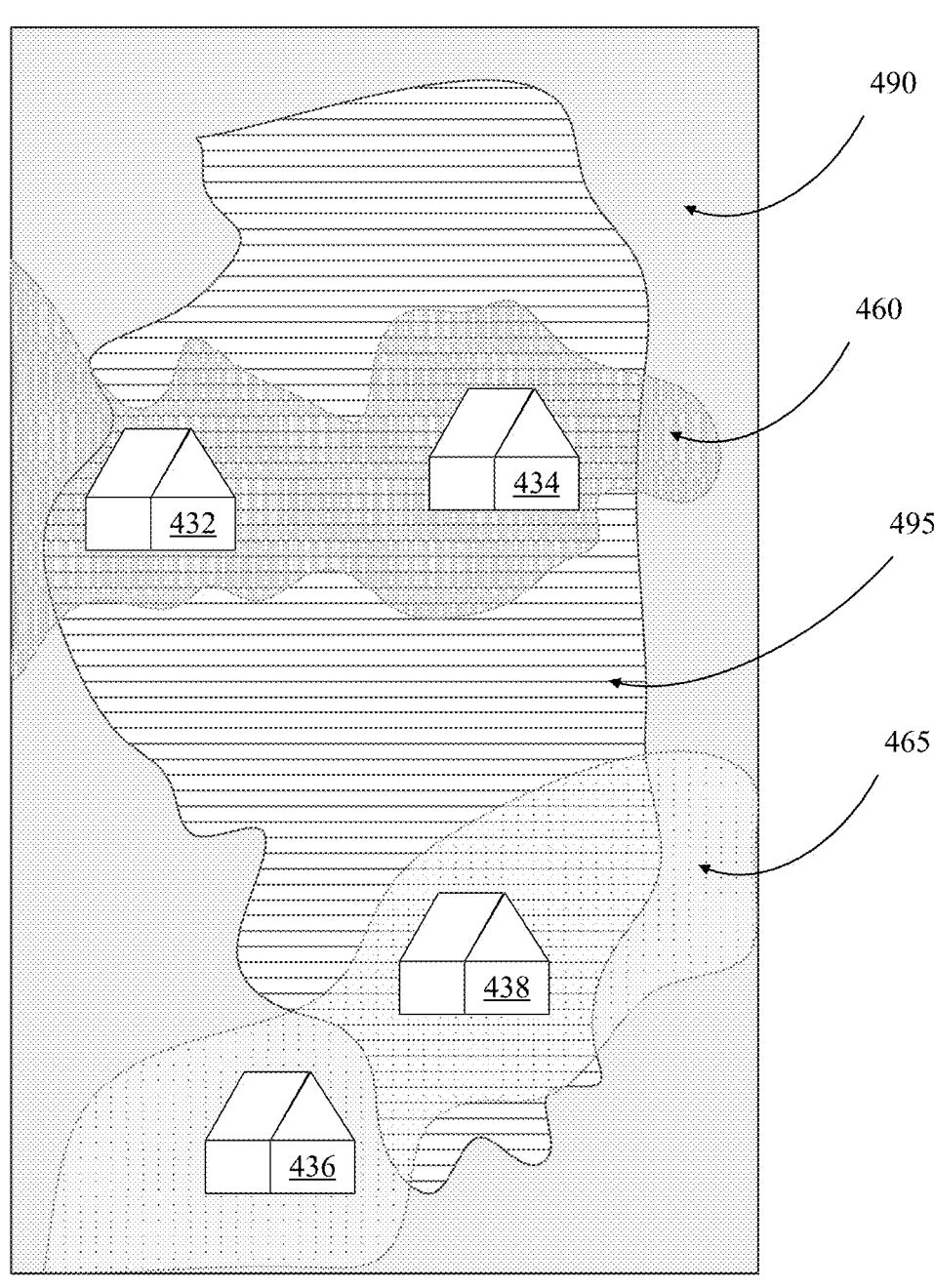
FIG. 4 illustrates an exemplary weather distribution map.

In some aspects, neighbor roof data may include roof data of a plurality of roofs near the geolocation of the roof, as further discussed in FIG. 4. FIG. 2 further discusses pitch data and orientation data. In some aspects, roof data may include data indicating a predicted lifespan of a roof as discussed further herein and in FIG. 2. FIG. 3 further discusses roof material data, factors of roof degradation, and imagery data; and FIG. 4 further discusses neighbor roof data. Roof data may include additional data not explicitly disclosed herein that may be utilized by the recommending module 128 to determine a roof recommendation, a lifespan of a roof, and/or other techniques disclosed herein.

Weather Data

In some aspects, weather data may include information of one or more of: (i) weather type, (ii) temperature, (iii) atmospheric pressure, (iv) humidity, (v) duration, (vi) weather severity, or (vii) weather acidity. For example, weather data may include information of a one-year period in the city of Gurnee, Illinois, and include information of 10 lightning storms lasting two hours each. One having ordinary skill in the art may appreciate additional information (e.g., air quality) indicating conditions a roof is exposed to in the environment besides those explicitly listed herein and may be utilized by the techniques herein for roof recommendation based upon cumulative weather damage.

In some aspects, information of weather type includes information of one or more weather events, such as (i) wind, (ii) tornado, (iii) hurricane, (iv) snowstorm, (v) sandstorm, (vi) lightning storm, (vii) rain, (viii) flash flood, (ix) hail, (x) extreme temperature, (xi) extreme temperature change, etc. For example, information of wind may include the direction of the wind, speed of the wind, duration of the wind, severity of the wind etc. One having ordinary skill in the art may appreciate the various information that may describe a weather event and may be utilized by the techniques herein. For example, information of a hurricane may include the path the hurricane traveled (i.e., distribution of the hurricane over geolocations over time), the speed the hurricane travelled (and thus the duration a geolocation was impacted by the hurricane) and the classification(s) of the hurricane (i.e., the severity of the hurricane) as indicated by e.g., the National Weather Service (NWS), the National Oceanic and Atmospheric Administration (NOAA), etc.

In another example, information of extreme temperature may include information of a weather event wherein the temperature is significantly different from the usual temperature, e.g., for the geolocation, for the time of year, etc. A weather event, such as temperature, maybe significantly different (i.e., extreme) when the temperature ranks in the highest or lowest e.g., 10%, of historical measurements, when meets a threshold difference from the mean, when the reoccurrence interval or probability of the event may increase, etc. Further, a weather event may be "extreme" when a weather authority, such as the NWS or the NOAA, categorize a weather event as extreme. Extreme temperature and extreme temperature change may influence the durability and/or physical properties of roof materials and accordingly influence a roof recommendation; however, it should be understood that information of an extreme weather event, as defined herein, may be included in information of weather type and/or weather data.

In some aspects, weather data includes information of atmospheric pressure. Information of atmospheric pressure may indicate weather conditions at a geolocation and/or the amount of pressure exerted on the roof by the atmosphere. Accordingly, the rate at which a roof degrades may be influenced by atmospheric pressure.

In some aspects, weather data includes information of humidity. Information of humidity may indicate an amount of moisture in the air surrounding a roof. Moisture in the air may be transferred to the roof and weaken (degrade) the roof. Similarly, air with little to no moisture (low humidity) may weaken/degrade a roof, such as by extracting moisture from the roof. In low humidity, moisture, which may have provided stability to a roof material, is unable to provide stability to certain roof materials and/or absorb solar radiation to prevent intense heat. Accordingly, the rate at which a roof degrades may be influenced by humidity In some aspects, weather data includes information of duration. Information of duration may indicate how long a weather event and/or information associated with a weather event (e.g., weather type, temperature, atmospheric pressure, humidity, weather severity, weather acidity, etc.) lasted. The longer a weather event, for example, the greater a roof may possibly be damaged. Accordingly, the rate at which a roof degrades may be influenced by duration.

In some aspects, weather data includes information of weather severity. Information of weather severity may indicate how severe a weather event and/or weather related event may have been and/or be in the future. For example, the severity of a hurricane may be indicated by categories, with a category 1 hurricane being less severe than a category 2 hurricane. The more severe a weather event the more damage a roof may experience. Accordingly, the rate at which a roof degrades may be influenced by weather severity.

In some aspects, weather data includes information of acidity. Information of acidity may indicate the pH level of the environment, such as air, rain, etc. For example, the average pH of rain is 5.6, which is more acidic than deionized water (neutral). However, rain may vary in acidity, with "acid rain" averaging a pH of 4.4 to 4.2. Roof materials may degrade at varying rates depending on the acidity of the environment they are exposed to. Accordingly, the rate at which a roof degrades may be influenced by acidity.

In some aspects, weather data may include forecasted weather data. For example, the external server 150 may be a publicly available server owned and operated by the NWS and store forecasted weather data indicating predicted weather events for a region on the memory 156. The predicted weather events may include weather events uncommon for the region, weather events expected to degrade property, and/or pose a threat to human life. Accordingly, the recommending module 128 may be configured to determine a roof recommendation based upon forecasted weather data, as discussed further herein.

In some aspects, the recommending module 128 may be configured to determine a weather severity score based upon weather data. In some aspects, a weather severity score may be a value indicating damage caused by a weather (or weather related) event, and/or how likely a roof would require inspection/maintenance subsequent to the weather (or weather related) event. For example, a hurricane classified by the NWS as a class three and may be 100 miles from a geolocation of a roof for two hours. Information of the hurricane (weather event) may be indicated by weather data. The recommending module 128 may determine a weather severity score indicating the weather event (hurricane) as a value based upon the weather data. In another example, a hailstorm may have passed over the geolocation of a roof for 30 minutes and dropped hail averaging one inch in diameter at a rate of 100 balls of hail per minute per 100 square feet. The weather event (hailstorm) may be indicated by the weather data obtained by the recommending module 128 from the external server 150. The recommending module 128 may subsequently determine a weather severity score indicating a high likelihood the roof may require inspection and/or maintenance (repair) due to the weather event.

In some aspects, the recommending module 128 may determine a weather severity score based upon roof data and/or weather data. Continuing the previous example, the recommending module 128 may obtain roof material data indicating the roof includes terracotta tiles which may be more likely to be damaged when impacted by hail. Accordingly, a weather severity score determined by the recommending module 128 for a roof including terracotta tiles may be greater than a weather severity score determined by the recommending module 128 for a roof including asphalt tiles, for example. In another example, a weather severity score may be based upon weather severity data.

In some aspects, the recommending module 128 may be configured to determine a roof recommendation based upon a weather severity score. Continuing the previous example, recommending module 128 may determine a roof recommendation based upon the weather severity score indicating a high likelihood the roof may require inspection. In some aspects, weather data associated with a roof may include one or more previous weather severity scores. Accordingly, the recommending module 128 may determine a roof recommendation based upon the one or more previous weather severity scores. For example, a first weather severity score may indicate it is unlikely a weather event caused sufficient damage for the roof to be inspected; however, the associated weather event may have caused micro-damages to the roof. In this example, the weather severity score may be a value, and a value above a threshold may indicate a high likelihood a roof may require inspection/maintenance. A second weather severity score may similarly indicate it is unlikely the respective weather event caused sufficient damage for the roof to be inspected; however, the recommending module 128 may determine a roof recommendation based upon the first weather severity score and the second weather severity score which cumulatively indicate a high likelihood the roof may require maintenance. In other words, the cumulative of the first and second weather severity scores may be above a threshold indicating a high likelihood the roof may require inspection/maintenance. Accordingly, in some aspects, the recommending module 128 may determine a roof recommendation based upon a cumulative impact of weather on the roof over a period of time.

As discussed elsewhere herein, the recommending module 128 may determine a roof recommendation specific to the utilized roof data and respective weather events associated with the utilized weather data. For example, a roof recommendation determined by the recommending module 128 based upon weather data of, e.g., 100 weather events (e.g., rain with pH below 5.6, wind, etc.) and roof data (e.g., roof material data indicating galvanized steel flashing, pitch data indicating a flat roof, etc.) may include a recommendation to inspect the flashing of the roof for corrosion from the weather events.

As previously discussed herein and as may be appreciated by one with ordinary skill in the art, the recommending module 128 may determine a roof recommendation based upon any combination(s) of roof data and weather data, including combinations not explicitly discussed herein. Further, the recommending module 128 may determine roof data and/or weather data based upon roof data and/or weather data. For example, imagery data (roof data) may indicate material used to install a roof of a home and be used by, e.g., the recommending module 128 to determine roof material data based. Accordingly, imagery data may indicate, e.g., pitch data, orientation data, weather type data, temperature data, duration data, etc. By utilizing weather data, and in some embodiments roof data, the recommending module 128 may enable more accurate and efficient roof recommendations (and thus roof maintenance) compared to conventional techniques.

Roof Recommendation

In some aspects, a roof recommendation may indicate one or more of: (i) a recommendation to repair the roof, (ii) a recommendation to repair a subsection of the roof, (iii) a recommendation to replace the roof, (iv) an indication of a projected lifespan of the roof, (v) a recommendation to contact an insurance provider, (vi) a recommendation to contact a roof contractor, and (vi) a recommendation to mitigate factors of roof degradation associated with the roof. For example, a roof recommendation may indicate a subsection of the roof is missing a row of shingles, to contact an insurance provider associated with an insurance plan covering the roof, and to contact a roof contractor to repair the missing row of shingles. In another example, a roof recommendation may indicate the roof is predicted to last another 10 years before needing to be replaced and indicate gutters should be cleared regularly to mitigate improper drainage. One having ordinary skill in the art would appreciate the roof recommendation may indicate additional recommendations not explicitly described herein that may be based upon cumulative weather damage.

In some aspects, the recommending module 128 may be configured to transmit the roof recommendation signal indicating the roof recommendation to the electronic device 140, a roof inspector electronic device, a contractor electronic device, and/or an insurance agent electronic device. For example, the recommending module 128 may determine a roof recommendation. Subsequently, the recommending module 128 may generate a roof recommendation signal indicating the roof recommendation and transmit the roof recommendation signal to the electronic device 140 via the network 110.

In some aspects, the roof recommendation signal may cause a user to inspect the roof. Continuing the previous example, a user (e.g., homeowner) may use the electronic device 140 and receive a roof recommendation signal indicating a roof recommendation to inspect the roof, e.g., for factors of roof degradation.

In some aspects, the recommending module 128 may be configured to generate a roof recommendation signal subsequent to a weather event. For example, a thunderstorm may occur near a geolocation of a roof, as further described in FIG. 4. The recommending module 128 may be configured to obtain weather data from the external server 150 every period of time (e.g., every hour, etc.), the external server 150 being a public server owned and operated by the NWS. The weather data obtained by the recommending module 128 at a first period of time may indicate the thunderstorm is near the geolocation of the roof and the weather data obtained by the recommending module 128 at a second period of time may indicate the thunderstorm is no longer near the geolocation of the roof. The recommending module 128 may subsequently determine the end of a weather event (thunderstorm) based upon weather data, and determine a roof recommendation based upon some, or all, weather data obtained up to the second period of time.

In some aspects, the recommending module 128 may determine a predicted lifespan of the roof based upon roof data and weather data, and determine a roof recommendation based upon the predicted lifespan. For example, roof data may indicate the age of a roof, the materials used to build the roof, the rate at which the respective materials erode, the geolocation of the roof, and the pitch of the roof. Weather data may indicate information of each weather event which occurred at the geolocation of the roof from the installation of the roof to the present. The recommending module 128 may determine the roof is predicted to last 10 more years based upon the weather data and the roof data. The recommending module 128 may further determine a roof recommendation based upon the predicted lifespan indicating, e.g., the predicted lifespan, the difference between the predicted lifespan and average lifespan of a roof of similar materials, geolocation, pitch, etc.

In some aspects, the roof recommendation may indicate an impact of the weather event to a lifespan of the roof. Continuing the previous example, the recommending module 128 may determine a first lifespan of a roof based upon roof data and weather data. The roof may subsequently experience a weather (or weather related) event and the recommending module 128 may determine a second lifespan of the roof based upon roof data and weather data. The recommending module 128 may compare the first lifespan to the second lifespan and generate a roof recommendation which indicates the impact the weather event had on the roof, for example, by including an absolute value of the difference between the first lifespan and the second lifespan.

In some embodiments where the weather data includes forecasted weather data, the recommending module 128 may be configured to determine a roof recommendation based upon the roof data and the forecasted weather data. Accordingly, forecasted weather data may be weather data over a second period of time, as described further in FIGS. 2A, 2B, 2C, and 2D. For example, a flash flood may be forecasted for a geolocation of a roof. Flash floods may pose significant threat to human life and damage to property such as roofs. Damage to life and property may be avoided and/or mitigated by proactive roof recommendations indicating, e.g., the predicted damage to a lifespan of a roof due to a forecasted flash flood. For example, the recommending module 128 may determine a roof is unlikely to protect the homeowner based upon roof data and forecasted weather data. Flash floods may further cause weather related events (mudslides, landslides, debris, etc.) to damage the roof. Accordingly, a roof recommendation may indicate fortifying the roof with additional roof materials such as sandbags, tarps, etc., and/or evacuating the property. In another example, roof recommendations based upon forecasted weather data may enable a user/homeowner to allocate funds towards roof maintenance and/or conceptualize micro-damages to a roof.

In some embodiments where a plurality of sensors (e.g. sensor 160) comprising one or more processors (e.g., processor(s) 162) are proximate to the roof, the recommending module 128 may be configured to receive sensor data from the plurality of sensors indicating information about the roof and determine a roof recommendation based upon the sensor data, as further discussed in FIG. 3.

In some aspects, a roof recommendation may indicate that no action is recommended, as discussed further in FIG. 2B.

Exemplary Structures and Cumulative Damage

Figure 2C:
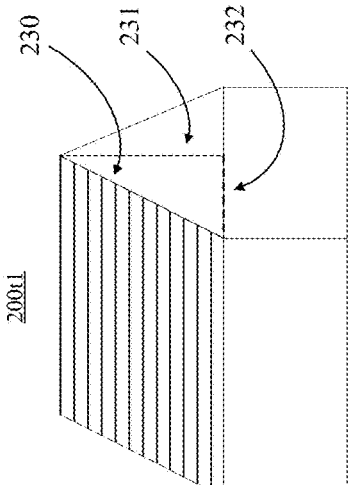
FIG. 2C illustrates an exemplary structure and cumulative damage caused by weather (or weather related) events.
Figure 2C:
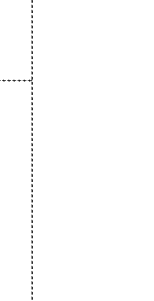
Figure 2D:
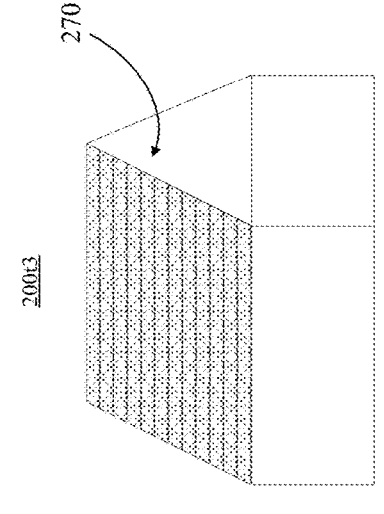
FIG. 2D illustrates an exemplary structure and cumulative damage caused by weather (or weather related) events.

Broadly speaking, FIGS. 2A, 2B, 2C, and 2D illustrate an exemplary structure at various time points in a lifespan of a roof. FIG. 2A illustrates a structure 200t1 including a roof 230, a vertical rise 231 of the roof 230, and a horizontal run 232 of the roof 230. In this exemplary illustration, the roof 230 is properly newly installed and should be understood to be at the beginning of a lifespan of a roof (e.g., 15 years). FIG. 2D illustrates a structure 200t4 including a roof 290. In this exemplary illustration, the roof 290 may be at the end of a lifespan of a roof. FIG. 2B illustrates a structure 200t2 including a roof 250, a first roof field 251, a second roof field 252, and an orientation 253 of the first roof field 251. In this exemplary illustration, the roof 250 may be one-third the way through a lifespan of a roof and the first roof field 251 may be oriented (e.g., orientation 253) to the southern cardinal direction. FIG. 2C illustrates a structure 200t3 including a roof 270. In this exemplary illustration, the roof 270 may be two-thirds the way through a lifespan of a roof. In this way, FIGS. 2A, 2B, 2C, 2D may further illustrate periods of time in a lifespan of a roof (e.g., time points). For example, from a first time point (e.g., FIG. 2A) at the beginning of a lifespan of a roof (e.g., 230) to a second time point (e.g., FIG. 2C) two-thirds the way through the lifespan of the roof (e.g., 270).

As discussed elsewhere herein, roof data may include pitch data associated with one or more pitches of a roof. FIG. 2A depicts the vertical rise 231 of the roof 230 and the horizontal run 232 of the roof 230. Pitch may be represented as a ratio of a vertical rise (e.g., 231) to a horizontal run (e.g., 232). In some aspects, the recommending module 128 may (i) obtain and/or receive pitch data including one or more vertical rises (e.g., 231) and one or more horizontal runs (e.g., 232) from, e.g., electrical device 140, sensor(s) 160, via the network 110, (ii) determine one or more pitches of the roof 230 based upon the one or more vertical rises and the one or more horizontal runs, (iii) and store the one or more pitches as pitch data in database 130. A roof may have more than one pitches, such as when a roof includes a dormer (e.g., 314, illustrated in FIG. 3).

Together, FIGS. 2A, 2B, 2C, and 2D illustrate a lifespan of a roof from, for example, installation (e.g., 230) to a roof (e.g., 290) requiring replacement. For example, the roof 230 may be a newly installed roof never exposed to micro-damages which cause degradation. The roof 250 may be the roof 230 degraded by micro-damages from weather (or weather related) events. In conventional techniques, roof 250 may be inspected by, e.g., an inspector, a homeowner, a roof contractor. In this example, the inspection by an inspector may result in no actionable roof recommendation. The roof 270 may be the roof 250 further degraded by micro-damages from weather (or weather related) events. In conventional techniques, the roof 270 may be inspected by the inspector and an inspection may result in the inspector recommending actionable roof maintenance (e.g., replace damaged tiles, reseal valleys, etc.) to prevent and/or mitigate possibly catastrophic consequences, and/or extend a lifespan of the roof 270. Catastrophic consequences may include, for example, water damage the structure, roof failure, roof collapse, property damage to items (not shown) inside the structure 200t3, injury and/or death to individuals (not shown) inside the structure 200t3, etc. The roof 290 may be the roof 270 further degraded by micro-damages from weather (or weather related) events, and no longer provide a suitable barrier for the structure 200t4 from an external environment (not shown) (e.g., weather, weather related events) and an interior (not shown) of the structure 200t4. In this example, the roof maintenance indicated by a roof recommendation from an inspector may or may not have been performed on the roof 270. In this example, an inspector may inspect the roof 290 and the inspector may provide a roof recommendation to replace (install) a new roof.

In this example, weather (or weather related) events cause micro-damages to the roof 230 until a roof recommendation of the roof 290 would indicate to install a new roof (not shown). Further, both the roof 250 and the roof 270 were inspected; however, only the inspection of the roof 270 provided a roof recommendation with actionable roof maintenance. Accordingly, resources (e.g., time, money) may be wasted by conventional techniques.

As previously discussed, a roof recommendation may indicate that no action is recommended. For example, a roof recommendation may indicate the roof 250 is performing within suitable parameters, such as preventing weather from damaging the structure 200t2, and/or no maintenance/inspection is recommended. Furthermore, a roof recommendation may indicate information regarding the roof while not indicating an action. For example, a roof recommendation based upon forecasted weather data may indicate a forecasted weather event may cause a micro-damage to the roof and decrease the predicted lifespan by a minute.

In some aspects, the recommending module 128 may be configured to determine a cumulative impact of weather on the roof over a period of time based upon roof data and weather data; and determine a roof recommendation based upon a cumulative impact of weather on the roof over the period of time. For example, the recommending module 128 may determine a roof recommendation for the roof 270 based upon weather data of a first period of time from a first time point (e.g., of FIG. 2A) to a second time point (e.g., of FIG. 2C). In some aspects, the recommending module 128 may aggregate the weather data of the first period of time with weather data of a second period of time. Continuing the previous example, a second time period may be from the second time point to a third time point (e.g., of FIG. 2D) and be associated with forecasted weather data. Accordingly, the recommending module 128 may aggregate the weather data of the first period of time with weather data of the second period of time and determine a roof recommendation based upon the aggregated weather data.

In another example, structure 200t1 may be owned by a first user and structure 200t2 may be the structure 200t1 (i) further degraded by micro-damages and (ii) owned by a second user. In this example, a first period of time may be from a first time point (e.g., of FIG. 2B) to a second time point (e.g., of FIG. 2C) and a second time point may be from a third time point (e.g., of FIG. 2A) to the second time point. The second period of time may be associated with historical weather data. Accordingly, as exemplified by this and the previous example, a first period of time may be prior or subsequent to a second period of time.

It would be understood by one having ordinary skill in the art that roof degradation is not a consistent linear progression, from installation to requiring replacement, and nor is a predicted lifespan of a roof (predicted by conventional techniques) equal to an actual lifespan of the roof because a roof may degrade more or less quickly than predicted. However, factors of roof degradation may contribute to a rate at which a roof degrades and be utilized by the techniques herein to more accurately predict a lifespan of a roof. Exemplary Implementation of a Plurality of Sensors Proximate to a Roof of a Structure and Factors of Roof Degradation Generally, FIG. 3 illustrates a plurality of exemplary factors of roof degradation 350 on an exemplary structure 300. FIG. 3 further illustrates a plurality of sensors 332 proximate to a roof 310, a roof supporting structure 316, a chimney 318, a dormer 314, a valley 312, and a ridge 320.

Factors of roof degradation may include sign(s) a roof has been degraded (e.g., experienced micro-damages) and/or sign(s) a roof may be degraded in the future. For example, missing shingles on a roof is evidence a roof has been degraded. If the missing shingles are not replaced, adjacent shingles may be damaged more easily (e.g., blown off by wind) than if no shingles were missing. Accordingly, the missing shingles are a sign a roof has been degraded and a sign the roof may be degraded in the future. By determining signs of damage and signs of future damage, both aspects may influence the recommending module 128, ML module 127, and/or any suitable component determining a more accurate roof recommendation when compared to conventional techniques.

Factors of roof degradation (sign(s) a roof is degrading) may include, for example, (i) a plurality of loose, missing, and/or damaged roof tiles (e.g., shingles), (ii) unsealed/ exposed material (e.g., nail(s), flashing), (iii) substandard and/or outdated methods/materials (e.g., tar used as flashing around a chimney), (iv) alive and/or dead organisms proximate to the roof (e.g., living plant(s), plants at risk of impacting a roof, decomposing plant(s), animal habitation, such as termites, birds, rats, etc.), etc. The illustrated placement of the factor(s) of roof degradation 350 is exemplary; accordingly, one having ordinary skill in the art would appreciate the factor(s) of roof degradation 350 may be present anywhere proximate to the structure 300, such as on top of, under, besides, and/or inside the structure 300, and effect, e.g., the roof 310, the roof supporting structure 316, the chimney 318, the dormer 314, the valley 312, the ridge 320, etc. Accordingly, the sensor(s) 332 may be present anywhere proximate to the structure 300 to enable the sensor(s) 332 to monitor (i) the environment proximate to the structure 300 and/or (ii) the roof 310 for roof data (e.g., roof material data), for factors of roof degradation, and/or for weather data.

In some aspects, the recommending module 128 may be configured to receive sensor data from a plurality of sensors (e.g., 160, 332) proximate to the roof and determine a roof recommendation based upon the sensor data. As described elsewhere herein, the sensor(s) 332 may include instrument(s) (not shown) capable of translating an environment the sensor(s) 332 exists within (e.g., proximate structure 300) into a computer-readable signal. In this regard, the sensor(s) 332 may generate sensor data. Sensor data may include roof data and/or weather data, as described elsewhere herein. For example, the sensor(s) 332 may be a sensor capable of measuring humidity. Accordingly, the sensor(s) 332 may measure humidity every five minutes and generate sensor data indicating one or more measurements of humidity. The sensor data may subsequently be stored by the memory 166 as sensor data and/or weather data.

Additionally, or alternatively, the sensor data may be transmitted to the server 120 via the network 110 and stored on the memory 126 as roof data and/or weather data (e.g., humidity data). In another example, the sensor(s) 332 may include an imaging device (not illustrated). Accordingly, the sensor(s) 332 may generate sensor data including imagery data and transmit the imagery data to server 120. Server 120 may store the imagery data as roof data in the memory 126.

In another example, moss on the roof 310 may be a sign the roof 310 has been degraded (e.g., shingles degraded to an extent to provide the moss a suitable environment to grow, shingles degraded by the moss growing on the shingles) and/or a sign the roof 310 may further be degraded (e.g., shingles degraded by the moss continuing to grow on the shingles). As such, the recommending module 128 and/or ML model(s) executed by the MLOM 125 may determine moss to be the factor of roof degradation 350 and utilize one or more factors of degradation as independent variables and/or dependent variables, as discussed in FIGS. 1B and 1C.

Exemplary Weather Distribution Map

FIG. 4 illustrates an exemplary weather distribution map 400 including a structure 432, a structure 434, a structure 436, a structure 438, a geolocation boundary 490, a geolocation boundary 495, a distribution 460 of a weather (or weather related) event, and a distribution 465 of a weather (or weather related) event.

In this illustration, the geolocation boundary 495 may be a neighborhood, postal code, region, topography, county, state, etc., and the geolocation boundary 490 may represent a neighborhood, postal code, region, topography, county, state, etc., other than the geolocation boundary 495. In this illustration, the distribution 460 may indicate an area experiencing a weather event, such as a thunderstorm, and the distribution 465 may indicate an area experiencing a different weather event, such as sunny and cloudless. The structure 432 and the structure 434 may both be experiencing the same weather event of the distribution 460 and be within the same geolocation boundary (e.g., 495), as illustrated. The structure 436 and the structure 438 may both be experiencing the same weather event of the distribution 465 and be in different geolocation boundaries (e.g., 490, 495, respectively), as illustrated.

In some aspects, weather data may be obtained by the recommending module 128 from the external server 150 and include distribution of weather events (e.g., 460, 465). For example, the recommending module 128 may use the geolocation (geolocation data) of structure 434 to obtain weather data from the external server 150 for the geolocation of structure 434. As illustrated, structure 434 is within the distribution 460 of a weather event. Accordingly, the weather data obtained by the recommending module 428 may indicate the weather event of the distribution 460.

Broadly speaking, FIG. 4 additionally illustrates the relationships between structures and the weather events the structures experience. For example, the structure 432 and the structure 434 may be neighboring structures and roof data of each structure may be included as neighbor roof data in the other's roof data. For example, the roof data of the structure 432 may be included as neighboring roof data in the roof data of structure 434.

Neighbor roof data may include roof data associated with neighboring structures (e.g., the structure 432 neighboring the structure 434, the structure 436 neighboring the structure 438), such as insurance data of other neighboring structures, factors of roof degradation of other neighboring structures, roof recommendations of other neighboring structures, etc. In some aspects, the recommending module 128 may determine a roof recommendation based upon neighbor roof data. For example, roof data associated with the structure 434 may indicate cracking shingles as a factor of roof degradation. Furthermore, the structure 434 may include a sensor (not shown) which generated imagery data indicating the cracking shingles. Weather data for the geolocation of the structure 432 and the geolocation of the structure 434 may indicate both structures experienced a weather event of extreme temperature change. However, because the structure 432 may not include a sensor, the recommending module 128 may determine a roof recommendation for the structure 432 based upon the roof data (neighbor roof data) of the structure 434. Similarly, any structure associated with minimal roof data and/or weather data, but associated with neighbor roof data, may benefit from the techniques disclosed herein.

In some aspects, the structure 432 and the structure 434 may be neighboring structures due to each experiencing the weather event of the distribution 460. In some aspects, the structure 436 and the structure 438 may be neighboring structures due to each experiencing the weather event of the distribution 465.

In some aspects, the structure 432 and the structure 434 may be neighboring structures due to each being within the geolocation boundary 495. In some aspects, the structure 438 and the structure 432 and/or the structure 434 may be neighboring structures due to each being within the geolocation boundary 495.

Exemplary Computer Implemented Method for Roof Recommendation Based Upon Cumulative Weather Damage FIG. 5 illustrates a flow diagram representing an exemplary computer implemented method or implementation 500 for roof recommendation based upon cumulative weather damage. The method 500 may be implemented by a computing environment 100 such as the server 120, the electronic device 140, and/or any suitable device including those discussed elsewhere herein, such as one or more local or remote processors, transceivers, memory units, sensors, mobile devices, unmanned aerial vehicles (e.g., drones), etc.

The method 500 may include receiving roof data from an electronic device and/or a database indicating at least a geolocation of a roof (block 502).

The method 500 may further include obtaining weather data for the geolocation of the roof indicating the weather over a period of time at least near the geolocation (block 504).

The method 500 may further include determining a roof recommendation based upon the roof data and the weather data (block 506).

The method 500 may further include generating a roof recommendation indicating the roof recommendation (block 508).

The method 500 may further include displaying, with one or more processors, the roof recommendation signal indicating the roof recommendation (block 510).

In various embodiments, the roof recommendation may be determined by a trained machine learning model.

In some embodiments, the roof data may be or include one or more of: (i) age data associated with an age of the roof, (ii) roof material data associated with one or more materials of the roof, (iii) pitch data associated with one or more pitches of the roof, (iv) orientation data associated with an orientation of the roof, (v) imagery data associated with one or more images of the roof, (vi) insurance data associated with one or more insurance claims associated with the roof, (vii) historical roof data associated with historic roof data associated with the roof, or (viii) neighbor roof data associated with roof data of a plurality of roofs near the geolocation.

In various embodiments, the method 500 may further include obtaining from the electronic device imagery data from an imaging device of a user associated with the roof. The imaging device of the user may be those described elsewhere herein, and/or mobile devices, robots, remotely controlled robots or crawlers, autonomous robots or crawlers, drones or autonomous drones (or other unmanned aerial vehicles (UAVs)), cameras, security systems, smart home or smart vehicle sensors or cameras, and/or other imaging devices.

In some embodiments, the weather data may be or include information of one or more of (i) weather type, (ii) temperature, (iii) atmospheric pressure, (iv) humidity, (v) duration, (vi) weather severity, or (vii) weather acidity.

In certain embodiments, the information of weather type may be or include information of one or more of (i) wind, (ii) tornado, (iii) hurricane, (iv) snowstorm, (v) sandstorm, (vi) lightning storm, (vii) rain, (viii) flash flood, (ix) hail, (x) extreme temperature, or (xi) extreme temperature change.

In various embodiments, the method 500 may further include determining a cumulative impact of weather on the roof over the period of time based upon the roof data and the weather data; and/or determining a roof recommendation based upon the cumulative impact of weather on the roof over the period of time.

In some embodiments, the method 500 may further include aggregating weather data of a first period of time with historical weather data of a second period of time, wherein the first period of time is subsequent to the second period of time.

In certain embodiments, the method 500 may further include determining a weather severity score based upon weather data.

In various embodiments, the roof recommendation may be or include one or more of (i) a recommendation to repair the roof, (ii) a recommendation to repair a subsection of the roof, (iii) a recommendation to replace the roof, (iv) an indication of a projected lifespan of the roof, (v) a recommendation to contact an insurance provider, (vi) a recommendation to contact a roof contractor, or (vii) a recommendation to mitigate factors of roof degradation associated with the roof.

In some embodiments, the method 500 may further include transmitting the roof recommendation signal to the electronic device, a roof inspector electronic device, a contractor electronic device, and/or an insurance agent electronic device.

In certain embodiments, the roof recommendation signal may cause a user to inspect the roof. In various embodiments, the method 500 may further include determining a predicted lifespan of the roof based upon the roof data and the weather data; and determining a roof recommendation based upon the predicted lifespan.

In some embodiments, the method 500 may further include generating a roof recommendation signal subsequent to a weather event. In certain embodiments, the roof recommendation may indicate an impact of the weather event to a lifespan of the roof. In various embodiments, the method 500 may further include determining a roof recommendation based upon the roof data and the forecasted weather data.

In some embodiments, the method 500 may further include processing the one or more images, identifying one or more factors of roof degradation present in one or more of the one or more images, and generating roof data based upon the one or more factors of roof degradation.

In certain embodiments, the method 500 may further include receiving sensor data from the plurality of sensors indicating information about the roof, determining a roof recommendation based upon the sensor data.

OTHER MATTERS

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

Furthermore, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A computer system configured for roof recommendation based upon analysis of cumulative weather damage, the system comprising:

one or more processors; and one or more non-transitory memories storing processor-executable instructions that, when executed by the one or more processors, cause the system to:

receive roof data from an electronic device and/or a database indicating at least a geolocation of a roof, obtain weather data for the geolocation of the roof indicating the weather over a period of time at least near the geolocation, aggregate, for the roof, degradation data, associated with a plurality of weather events that occurred at least near the geolocation, to compute a cumulative impact of weather score reflecting accumulated weather-induced damage to the roof over time, determine, based upon the cumulative impact of weather score, a roof recommendation including one or more directives when the cumulative impact of weather score satisfies a threshold, wherein the roof recommendation is determined by a trained machine learning model, generate a roof recommendation signal indicating the roof recommendation, and present, via a display and/or voicebot, the roof recommendation.

2. The computer system of claim 1, wherein roof data includes one or more of:

(i) age data associated with an age of the roof, (ii) roof material data associated with one or more materials of the roof, (iii) pitch data associated with one or more pitches of the roof, (iv) orientation data associated with an orientation of the roof, (v) imagery data associated with one or more images of the roof, (vi) insurance data associated with one or more insurance claims associated with the roof, (vii) historical roof data associated with historic roof data associated with the roof, or (viii) neighbor roof data associated with roof data of a plurality of roofs near the geolocation.

3. The computer system of claim 1, the one or more non-transitory memories storing processor-executable instructions further comprising instructions that, when executed by the one or more processors, cause the system to:

obtain, from one or more processors of the electronic device, imagery data from an imaging device of a user associated with the roof.

4. The computer system of claim 1, wherein the weather data includes information of one or more of:

(i) weather type, (ii) temperature, (iii) atmospheric pressure, (iv) humidity, (v) duration, (vi) weather severity, or (vii) weather acidity.

5. The computer system of claim 4, wherein the weather data includes information of the weather type, and wherein the information of weather type includes information of one or more of:

(i) wind, (ii) tornado, (iii) hurricane, (iv) snowstorm, (v) sandstorm, (vi) lightning storm, (vii) rain, (viii) flash flood, (ix) hail, (x) extreme temperature, or (xi) extreme temperature change.

6. The computer system of claim 1, the one or more non-transitory memories storing processor-executable instructions further comprising instructions that, when executed by the one or more processors, cause the system to:

determine a weather severity score based upon the weather data.

7. The computer system of claim 1, wherein the roof recommendation indicates one or more of:

(i) a recommendation to repair the roof, (ii) a recommendation to repair a subsection of the roof, (iii) a recommendation to replace the roof, (iv) an indication of a projected lifespan of the roof, (v) a recommendation to contact an insurance provider, (vi) a recommendation to contact a roof contractor, or (vii) a recommendation to mitigate factors of roof degradation associated with the roof.

8. The computer system of claim 1, the one or more non-transitory memories storing processor-executable instructions further comprising instructions that, when executed by the one or more processors, cause the system to:

transmit the roof recommendation signal to the electronic device, a roof inspector electronic device, a contractor electronic device, and/or an insurance agent electronic device.

9. The computer system of claim 8, wherein the roof recommendation signal causes a user to inspect the roof.

10. The computer system of claim 1, the one or more non-transitory memories storing processor-executable instructions further comprising instructions that, when executed by the one or more processors, cause the system to:

determine a predicted lifespan of the roof based upon the roof data and the weather data, and determine the roof recommendation based upon the predicted lifespan.

11. The computer system of claim 1, further comprising instructions that, when executed by the one or more processors, cause the system to:

generate the roof recommendation signal subsequent to a weather event.

12. The computer system of claim 11, wherein the roof recommendation indicates an impact of the weather event to a lifespan of the roof.

13. The computer system of claim 1, wherein weather data includes forecasted weather data; and the one or more non-transitory memories storing processor-executable instructions further comprising instructions that, when executed by the one or more processors, cause the system to:

determine the roof recommendation based upon the roof data and the forecasted weather data.

14. The computer system of claim 1, wherein the roof data includes imagery data associated with one or more images of the roof; and the one or more non-transitory memories storing processor-executable instructions further comprising instructions that, when executed by the one or more processors, cause the system to:

process the one or more images, identify one or more factors of roof degradation present in one or more of the one or more images, and generate roof data based upon the one or more factors of roof degradation.

15. The computer system of claim 1, wherein a plurality of sensors comprising one or more processors are proximate to the roof; and the one or more non-transitory memories storing processor-executable instructions further comprising instructions that, when executed by the one or more processors of the computer system, cause the system to:

receive sensor data from the plurality of sensors indicating information about the roof, and determine the roof recommendation based upon the sensor data.

16. A computer-implemented method for roof recommendation based upon analysis of cumulative weather damage, the method comprising:

receiving, with one or more processors, roof data from an electronic device and/or a database indicating at least a geolocation of a roof, obtaining, with the one or more processors, weather data for the geolocation of the roof indicating the weather over a period of time at least near the geolocation, aggregating, with the one or more processors, for the roof, degradation data, associated with a plurality of weather events that occurred at least near the geolocation, to compute a cumulative impact of weather score reflecting accumulated weather-induced damage to the roof over time, determining, with the one or more processors, based upon the cumulative impact of weather score, a roof recommendation including one or more directives when the cumulative impact of weather score satisfies a threshold, wherein the roof recommendation is determined by a trained machine learning model, generating, with the one or more processors, a roof recommendation signal indicating the roof recommendation, and present, with the one or more processors, via a display and/or voicebot, the roof recommendation.

17. A non-transitory computer-readable storage medium comprising computer-readable instructions stored thereon for roof recommendation based upon analysis of cumulative weather damage, wherein the instructions when executed on one or more processors cause the one or more processors to:

receive roof data from an electronic device and/or a database indicating at least a geolocation of a roof, obtain weather data for the geolocation of the roof indicating the weather over a period of time at least near the geolocation, aggregate, for the roof, degradation data, associated with a plurality of weather events that occurred at least near the geolocation, to compute a cumulative impact of weather score reflecting accumulated weather-induced damage to the roof over time, determine, based upon the cumulative impact of weather score, a roof recommendation including one or more directives when the cumulative impact of weather score satisfies a threshold, wherein the roof recommendation is determined by a trained machine learning model, generate a roof recommendation signal indicating the roof recommendation, and present, via display and/or voicebot, the roof recommendation.

\* \* \* \* \*